(12) United States Patent
Park et al.

(10) Patent No.: US 12,476,737 B2
(45) Date of Patent: Nov. 18, 2025

(54) ELECTRONIC DEVICE AND COMMUNICATION SYSTEM INCLUDING THE SAME

(71) Applicant: SAMSUNG ELECTRONICS CO., LTD., Suwon-si (KR)

(72) Inventors: Jinyong Park, Suwon-si (KR); Kyungho Ryu, Suwon-si (KR); Yongil Kwon, Suwon-si (KR); Alankyongho Kim, Suwon-si (KR); Yong-Yun Park, Suwon-si (KR); Jung-Pil Lim, Suwon-si (KR); Hyunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 18/646,461

(22) Filed: Apr. 25, 2024

(65) Prior Publication Data
US 2025/0023664 A1    Jan. 16, 2025

(30) Foreign Application Priority Data
Jul. 13, 2023    (KR) .................. 10-2023-0091377

(51) Int. Cl.
*H04L 1/00*    (2006.01)
(52) U.S. Cl.
CPC .......... *H04L 1/0073* (2013.01); *H04L 1/0061* (2013.01)

(58) Field of Classification Search
CPC ........ H04L 1/16; H04L 1/0061; H04L 1/0073
See application file for complete search history.

(56) References Cited

U.S. PATENT DOCUMENTS

| | | |
|---|---|---|
| 7,146,146 B2 | 12/2006 | Masenten et al. |
| 7,522,671 B2 | 4/2009 | Kiamilev et al. |
| 8,831,142 B2 | 9/2014 | Kotagiri et al. |
| 9,338,036 B2 | 5/2016 | Poulton et al. |
| 9,385,695 B2 | 7/2016 | Chen et al. |
| 10,135,400 B2 | 11/2018 | Kang et al. |
| 11,368,330 B2 | 6/2022 | De Haas |
| 2017/0276509 A1* | 9/2017 | Nakajima ............... H03L 7/083 |
| 2020/0201718 A1* | 6/2020 | Richter ............... G06F 11/1469 |

FOREIGN PATENT DOCUMENTS

KR    10-0464326    1/2005

* cited by examiner

*Primary Examiner* — Shelly A Chase
(74) *Attorney, Agent, or Firm* — Fish & Richardson P.C.

(57) ABSTRACT

Provided is a communication system including a first electronic device and a second electronic device connected with each other through first and second channels. The second electronic device includes a reception driver generating a first internal signal based on a first data signal provided by the first electronic device through the first channel, an error detector generating an error detection signal by determining whether an error is included in the first internal signal, and an error adjuster outputting a first feedback signal through the second channel based on the error detection signal, and the first electronic device outputs a second data signal having a voltage swing width determined based on the first feedback signal through the first channel.

19 Claims, 23 Drawing Sheets

ELECTRONIC DEVICE AND COMMUNICATION SYSTEM INCLUDING THE SAME

CROSS-REFERENCE TO RELATED APPLICATION

This application claims priority to and the benefit of Korean Patent Application No. 10-2023-0091377 filed in the Korean Intellectual Property Office on Jul. 13, 2023, the entire contents of which are incorporated herein by reference.

TECHNICAL FIELD

The present disclosure relates to an electronic device and a communication system including the same. More particularly, the present disclosure relates to electronic devices communicating with each other at a high speed and a communication system including the same.

BACKGROUND

An electronic device may transfer data by transferring a signal through a channel. In recent years, a transmission speed of the signal transferred through a channel has increased as an amount of data processed by the electronic device has increased. Accordingly, it becomes more difficult for the electronic device that has received the signal to restore the data from the received signal due to various types of noise.

For example, a sudden signal disturbance may occur from the outside of a communication system while the electronic device transmits and receives the signal. In this case, an error may occur in an operation of the electronic device receiving the signal.

SUMMARY

The present disclosure addresses the above-mentioned technical problem. More particularly, the present disclosure provides an electronic device with improved immunity to a signal disturbance from the outside and a communication system including the same.

In general, aspects of the subject matter described in this specification can be embodied in a communication system including a first electronic device and a second electronic device connected with each other through first and second channels. The second electronic device includes a reception driver generating a first internal signal based on a first data signal provided by the first electronic device through the first channel, an error detector generating an error detection signal by determining whether an error is included in the first internal signal, and an error adjuster outputting a first feedback signal through the second channel based on the error detection signal, and the first electronic device outputs a second data signal having a voltage swing width determined based on the first feedback signal through the first channel.

Another general aspect can be embodied in an electronic device including: a reception driver including an amplify circuit generating a first amplified data signal based on a first data signal provided by an external device, an error detector generating an error detection signal by determining whether an error occurs in an operation of the reception driver generating a first bitstream based on the first amplified data signal, and an error adjuster controlling a voltage gain of the amplify circuit based on the error detection signal.

Another general aspect can be embodied in an communication system including: a first electronic device including a transmission driver, and a second electronic device receiving a data signal from the transmission driver through a first channel, wherein the second electronic device includes a reception driver including an amplify circuit amplifying the data signal through the first channel, an error detector generating an error detection signal based on whether an error occurs in an operation of the reception driver in response to the data signal, and an error adjuster controlling an output swing level of the transmission driver and a voltage gain of the amplify circuit in response to the error detection signal.

DETAILED DESCRIPTION

Figure 1:
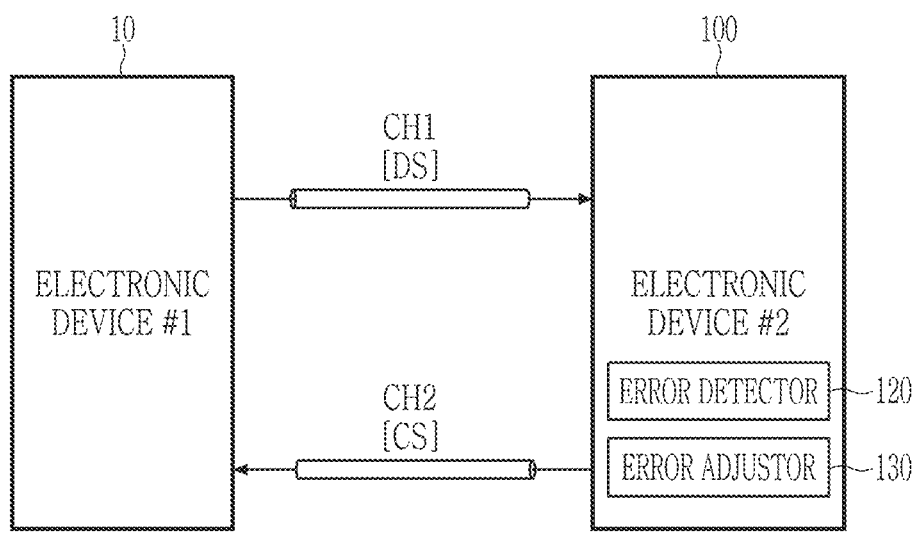
FIG. 1 is a block diagram showing an example of a communication system.

Hereinafter, examples of the present disclosure are described clearly and in detail for those skilled in the art to which the present disclosure pertains to easily implement the present disclosure. Details such as specific configurations and structures are provided only to facilitate a general understanding of the examples of the present disclosure. Therefore, modifications of the examples described herein may be performed by those skilled in the art without departing from the spirit and scope of the present disclosure. Moreover, the description omits descriptions of well-known functions and structures for clarity and conciseness. Components in the following drawings or detailed description may be connected with other components other than those shown in the drawings or described in the detailed description. Terms used in the specification are terms defined in consideration of functions in the present disclosure and are not limited to specific functions. Definitions of the terms may be determined based on details described in the detailed description.

Components described with reference to terms such as a driver or a block used in the detailed description may be implemented in software, hardware, or a combination thereof. Illustratively, the software may be a machine code, a firmware, an embedded code, or application software. For example, the hardware may include an electrical circuit, an electronic circuit, a processor, a computer, integrated circuit cores, a pressure sensor, an inertial sensor, a micro electro mechanical systems (MEMS), a passive component, or a combination thereof.

FIG. 1 is a block diagram showing a communication system. Referring to FIG. 1, the communication system includes a first electronic device 10 (or an electronic device #1) and a second electronic device 100 (or an electronic device #2). The first electronic device 10 and the second electronic device 100 communicate with each other through a first channel CH1 and a second channel CH2.

The first electronic device 10 may transfer a data signal DS to the second electronic device 100 through the first channel CH1. In this case, the second electronic device 100 may generate data by decoding the data signal DS. The second electronic device 100 may be operated based on the generated data.

In some implementations, the data signal DS may be transferred in a form of a differential voltage through the first channel CH1.

The second electronic device 100 may transfer a control signal CS to the first electronic device 10 through the second channel CH2. For example, the second electronic device 100 may transfer the control signal requesting transmission of the data or stop of the transmission of the data through the second channel CH2. However, the scope of the present disclosure is not limited thereto, and the second electronic device 100 may transfer various types of control signals through the second channel CH2.

In some implementations, the first channel CH1 may be referred to as a data channel. The second channel CH2 may be referred to as a feedback channel.

In some implementations, the first electronic device 10 and the second electronic device 100 may communicate with each other through serial communication. That is, the first channel CH1 and the second channel CH2 may each support the serial communication. However, the scope of the present disclosure is not limited thereto.

In the foregoing example, the first electronic device 10 is a graphic processing unit (GPU) and the second electronic device 100 is a display device. However, the scope of the present disclosure is not limited thereto, and the first electronic device 10 and the second electronic device 100 may each be any type of electronic device.

In some implementations, the first electronic device 10 and the second electronic device 100 may communicate with each other based on a display port (DP) interface or a high-definition multimedia interface (HDMI). In this case, the first electronic device 10 may be referred to as a source device, and the second electronic device 100 may be referred to as a sink device. However, the scope of the present disclosure is not limited thereto, and the first electronic device 10 and the second electronic device 100 may communicate with each other based on any high-speed communication interface.

In some implementations, noise may be included in the data signal DS transferred through the first channel CH1 or an error may occur in an operation of a component of the second electronic device 100, due to an external influence for the communication system. In this case, the signals transferred between the components of the second electronic device 100 may include noise.

For example, signal disturbance may occur due to various types of electromagnetic waves such as global system for mobile communications (GSM) frequencies when another electronic device (e.g., mobile phone) physically approaches the second electronic device 100. In this case, the error may occur in the operation of the component of the second electronic device 100, and the error may thus occur in the data restored by the second electronic device 100. As a result, the error may also occur in an operation of the second electronic device 100 based thereon. Hereinafter, the description describes the configuration and operation of the second electronic device 100 to reduce influences of the disturbance and noise.

The second electronic device 100 may include an error detector 120. The error detector 120 may detect the error occurring in the operation of the second electronic device 100. That is, the error detector 120 may determine whether the error occurs in the operation of the second electronic device 100. The description describes the more specific configuration and operation of the error detector 120 in more detail with reference to FIGS. 3 to 7 below.

The second electronic device 100 may include an error adjuster 130. The error adjuster 130 may adjust (or mitigate) noise caused by the external influence of the communication system based on a detection result of the error detector 120.

In some implementations, the error adjuster 130 may increase a voltage swing width of the data signal DS transferred through the first channel CH1. In this case, a relative ratio of noise to the data signal DS may be reduced, thus the influence of noise occurring by the external influence of the communication system may be reduced. It is thus possible to reduce the error occurring in the data decoded by the second electronic device 100. The description describes an example in which the influence of the signal disturbance is reduced by adjusting the voltage swing width of the data signal DS in more detail with reference to FIG. 2A below.

In some implementations, the error adjuster 130 may increase a magnitude of the signal transferred between the components of the second electronic device 100. For example, the error adjuster 130 may increase a voltage gain of an amplify circuit (and for example, a continuous time linear equalization (CTLE) circuit) included in the second electronic device 100. In this case, it is possible to reduce the influence of noise on an offset current and an offset voltage transferred between the components of the second electronic device 100. It is thus possible to reduce the error occurring in the data decoded by the second electronic device 100. In this example, the influence of noise is reduced by adjusting the magnitude of the signal transferred between the components of the second electronic device 100 in more detail with reference to FIG. 2B below.

That is, the error adjuster 130 may reduce the influence of noise caused by the external influence of the communication system by increasing the voltage swing width of the data signal DS or the magnitude of the signal transferred between the components of the second electronic device 100. However, in this case, the second electronic device 100 may have increased power consumption or increased vulnerability to electromagnetic interference (EMI). Hereinafter, the description describes in detail the configuration and operation method of the communication system for reducing the power consumption of the second electronic device 100 and the vulnerability of the second electronic device 100 to the EMI while reducing the influence of noise caused by the external influence of the communication system.

Figure 2A:
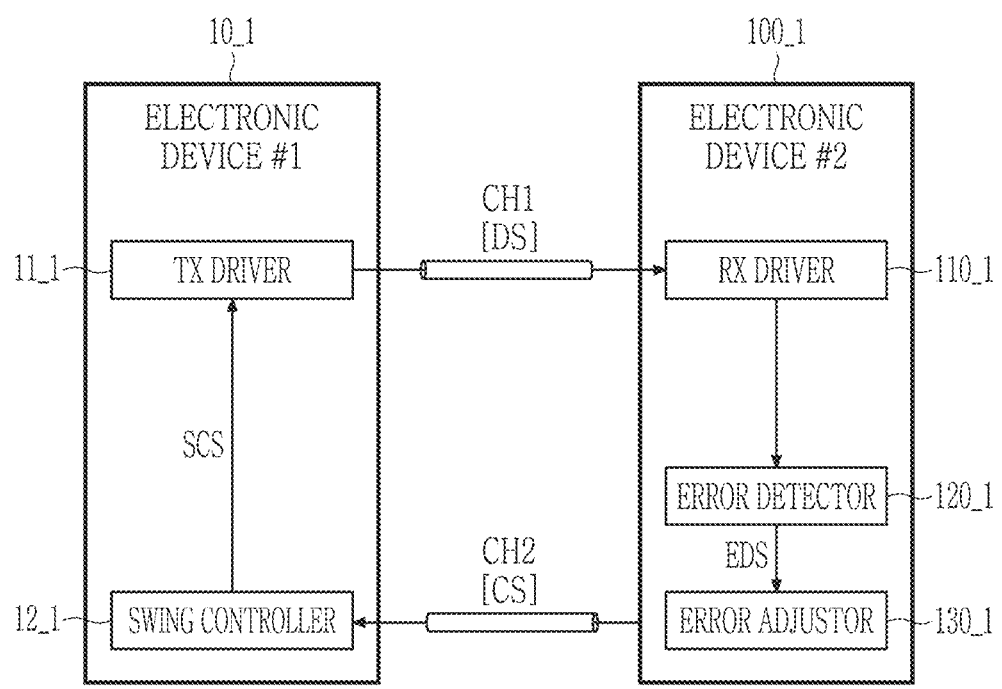
FIGS. 2A and 2B are views each showing in more detail some configurations of the communication system of FIG. 1.
Figure 2B:
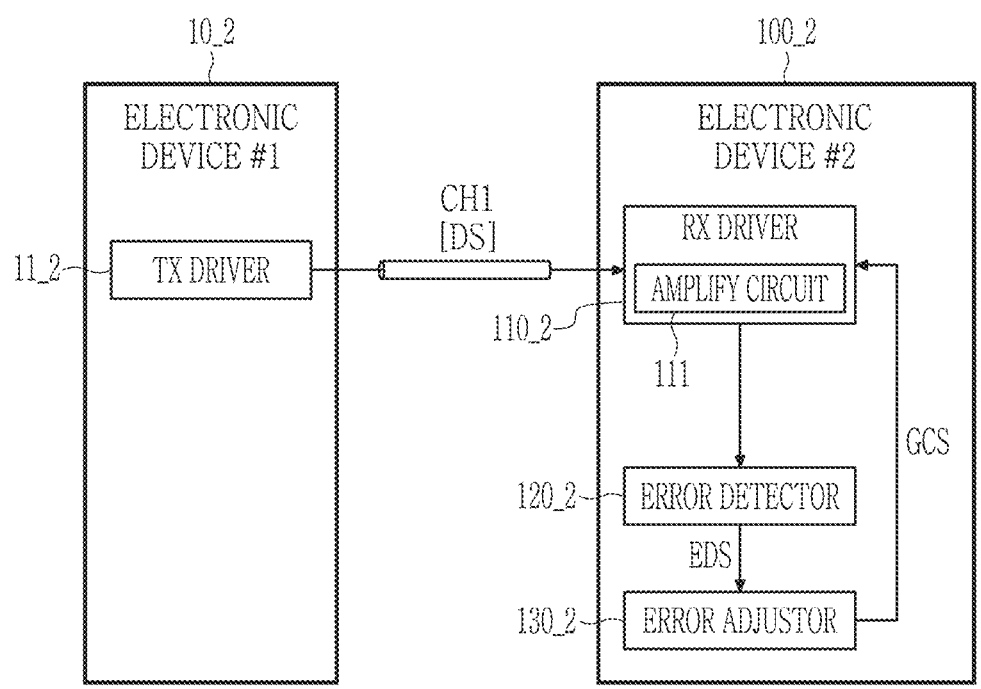

FIGS. 2A and 2B are views each showing in more detail some configurations of the communication system of FIG. 1. In a first example, the influence of noise is reduced by adjusting the voltage swing width of the data signal DS with reference to FIG. 2A. In a second example, the influence of noise is reduced by adjusting the magnitude of the signal transferred between the components of the second electronic device 100 with reference to FIG. 2B.

First, referring to FIGS. 1 and 2A, a first electronic device 10_1 may include a transmission driver 11_1 and a swing controller 12_1.

The transmission driver 11_1 may provide a second electronic device 100_1 with the data signal DS through the first channel CH1.

The second electronic device 100_1 may include a reception driver 110_1, an error detector 120_1, and an error adjuster 130_1.

The reception driver 110_1 may receive the data signal DS through the first channel CH1. The reception driver 110_1 may generate bitstream data by decoding the received data signal DS. The description describes the more specific configuration and operation of the reception driver 110_1 in more detail with reference to FIG. 3 below.

The error detector 120_1 may determine whether the error occurs in the operation of the reception driver 110_1. For example, the error detector 120_1 may detect the error in an internal signal of the reception driver 110_1 to determine whether the error occurs in the operation of the reception driver 110_1. The error detector 120_1 may generate an error detection signal EDS based on a determination result.

In this example, the error detection signal EDS indicates logic high when the error detector 120_1 determines that the error occurs in the operation of the reception driver 110_1. In another example, the error detection signal EDS indicates logic low when the error detector 120_1 determines that no error occurs in the operation of the reception driver 110_1. However, the scope of the present disclosure is not limited thereto, and the error detection signal EDS may be any type of signal indicating whether the error occurs in the operation of the reception driver 110_1.

An error adjuster 130_1 may receive the error detection signal EDS. The error adjuster 130_1 may provide a swing controller 12_1 with the control signal CS through the second channel CH2 based on the determination result of the error detector 120_1. That is, the error adjuster 130_1 may control the swing controller 12_1 based on the determine result of the error detector 120_1.

The swing controller 12_1 may control the transmission driver 11_1 in response to the control signal CS. For example, the swing controller 12_1 may set an output swing level of the transmission driver 11_1 by providing the transmission driver 11_1 with a swing control signal SCS. In this case, the transmission driver 11_1 may output the data signal DS having a voltage swing width corresponding to the set output swing level. That is, the voltage swing width of the data signal DS may be changed when the output swing level of the transmission driver 11_1 is changed. The description describes a waveform of the data signal DS based on a change in the output swing level of the transmission driver 11_1 in more detail with reference to FIGS. 8A and 8B below.

In some implementations, the swing controller 12_1 may change the output swing level of the transmission driver 11_1 by adjusting a voltage gain of an amplify circuit (not shown) included in the transmission driver 11_1. However, the scope of the present disclosure is not limited to a specific method for controlling the output swing level of the transmission driver 11_1.

That is, the error adjuster 130_1 In some implementations may adjust the output swing level of the transmission driver 11_1 by the swing controller 12_1. In this case, it is possible to adjust the voltage swing width of the data signal DS output by the transmission driver 11_1.

For example, the error adjuster 130_1 may increase the output swing level of the transmission driver 11_1 by controlling the swing controller 12_1 when the error detection signal EDS indicates the logic high. In this case, it is possible to increase the voltage swing width of the data signal DS output by the transmission driver 11_1. It is thus possible to reduce the influence of noise caused by the external influence of the communication system on the reception driver 110_1.

In some implementations, the error adjuster 130_1 may maintain the output swing level of the transmission driver 11_1 when the output swing level of the transmission driver 11_1 is an upper limit value (that is, the output swing level of the transmission driver 11_1 that corresponds to an upper limit value of the voltage swing width of the data signal DS) and the error detection signal EDS indicates the logic high. That is, the error adjuster 130_1 may control the output swing level of the transmission driver 11_1 to be the upper limit value or less.

On the other hand, the error adjuster 130_1 may reduce the output swing level of the transmission driver 11_1 by the swing controller 12_1 when the error detection signal EDS indicates the logic low. In this case, the voltage swing width of the data signal DS output by the transmission driver 11_1 may be reduced, thus reducing the power consumption of the second electronic device 100 and the vulnerability of the second electronic device 100 to the EMI.

In some implementations, the error adjuster 130_1 may maintain the output swing level of the transmission driver 11_1 when the output swing level of the transmission driver 11_1 is a lower limit value (that is, the output swing level of the transmission driver 11_1 that corresponds to a lower limit value of the voltage swing width of the data signal DS) and the error detection signal EDS indicates the logic low. That is, the error adjuster 130_1 may control the output swing level of the transmission driver 11_1 to be the lower limit value or more.

That is, in some implementations, it is possible to adaptively adjust the voltage swing width of the data signal generated by the transmission driver 11_1 based on whether that error is detected in the operation of the reception driver 110_1. Therefore, In some implementations, it is possible to reduce the power consumption of the second electronic device 100_1 and the vulnerability of the second electronic device 100_1 to the EMI while reducing the influence of noise caused by the external influence of the communication system.

In some implementations, the upper limit value of the voltage swing width of the data signal DS may be determined as the maximum magnitude of the data signal DS to be normally transferred through the first channel CH1. However, the scope of the present disclosure is not limited thereto.

In some implementations, the lower limit value of the voltage swing width of the data signal DS may be determined as the minimum magnitude of the data signal DS to be normally decoded by the second electronic device 100. However, the scope of the present disclosure is not limited thereto.

Next, referring to FIGS. 1 and 2B, a first electronic device 10_2 may include a transmission driver 11_2. The transmission driver 11_2 may provide a second electronic device 100_2 with the data signal DS through the first channel CH1.

The second electronic device 100_2 may include a reception driver 110_2, an error detector 120_2, and an error adjuster 130_2.

The reception driver 110_2 may receive the data signal DS through the first channel CH1. The reception driver 110_2 may generate bitstream data by decoding the received data signal DS. The description describes the more specific configuration and operation of the reception driver 110_2 in more detail with reference to FIG. 3 below.

The error detector 120_2 may determine whether the error occurs in the operation of the reception driver 110_2. The error detector 120_2 may generate the error detection signal EDS based on a determination result. An operation of the error detector 120_2 is similar to that described with reference to FIG. 2A, and the description thus omits its details.

The error adjuster 130_2 may receive the error detection signal EDS. The error adjuster 130_2 may control the reception driver 110_2 based on the error detection signal EDS. For example, the error adjuster 130_2 may provide the reception driver 110_2 with a gain control signal GCS to control a voltage gain of an amplify circuit 111 included in the reception driver 110_2. In this case, it is possible to adjust a magnitude of a signal transferred between components in the reception driver 110_2.

In some implementations, the amplify circuit 111 may be directly connected with the first channel CH1. For example, the amplify circuit 111 may directly receive the data signal DS from the first channel CH1 and output an amplified data signal. However, the scope of the present disclosure is not limited thereto.

The error adjuster 130_2 may increase the voltage gain of the amplify circuit 111 when the error detection signal EDS indicates the logic high. In this case, the magnitude of the signal transferred between the components in the reception driver 110_2 may be increased, thus reducing the influence of noise caused by the external influence of the communication system.

In some implementations, the error adjuster 130_2 may maintain the voltage gain of the amplify circuit 111 when the voltage gain of the amplify circuit 111 is an upper limit value (for example, the maximum voltage gain of the amplify circuit 111 for normally operate the transmission driver 11_2) and the error detection signal EDS indicates the logic high. That is, the error adjuster 130_2 may control the voltage gain of the amplify circuit 111 to be the upper limit value or less.

On the other hand, the error adjuster 130_2 may reduce the voltage gain of the amplify circuit 111 when the error detection signal EDS indicates the logic low. In this case, the magnitude of the signal transferred between the components in the reception driver 110_2 may be reduced, thus reducing power consumption of the second electronic device 100_2 and vulnerability of the second electronic device 100_2 to the EMI.

In some implementations, the error adjuster 130_2 may maintain the voltage gain of the amplify circuit 111 when the voltage gain of the amplify circuit 111 is a lower limit value (for example, the minimum voltage gain of the amplify circuit 111 for normally decoding the data signal DS) and the error detection signal EDS indicates the logic low. That is, the error adjuster 130_2 may control the voltage gain of the amplify circuit 111 to be the lower limit value or more.

In some implementations, the amplify circuit 111 may include a continuous time linear equalization (CTLE) circuit. In this case, the error adjuster 130_2 may adjust the voltage gain of the amplify circuit 111 by adjusting a magnitude of at least one bias current source included in the CTLE circuit. The description describes a specific method of the error adjuster 130_2 adjusting the voltage gain of the amplify circuit 111 in more detail with reference to FIG. 10 below.

In some implementations, it is possible to adaptively adjust the magnitude of the signal transferred between the components in the reception driver 110_2 based on whether the error caused by the external influence of the communication system is detected. Therefore, In some implementations, it is possible to reduce the power consumption of the second electronic device 100 and the vulnerability of the second electronic device 100 to the EMI while reducing the influence of noise caused by the external influence of the communication system.

Figure 3:
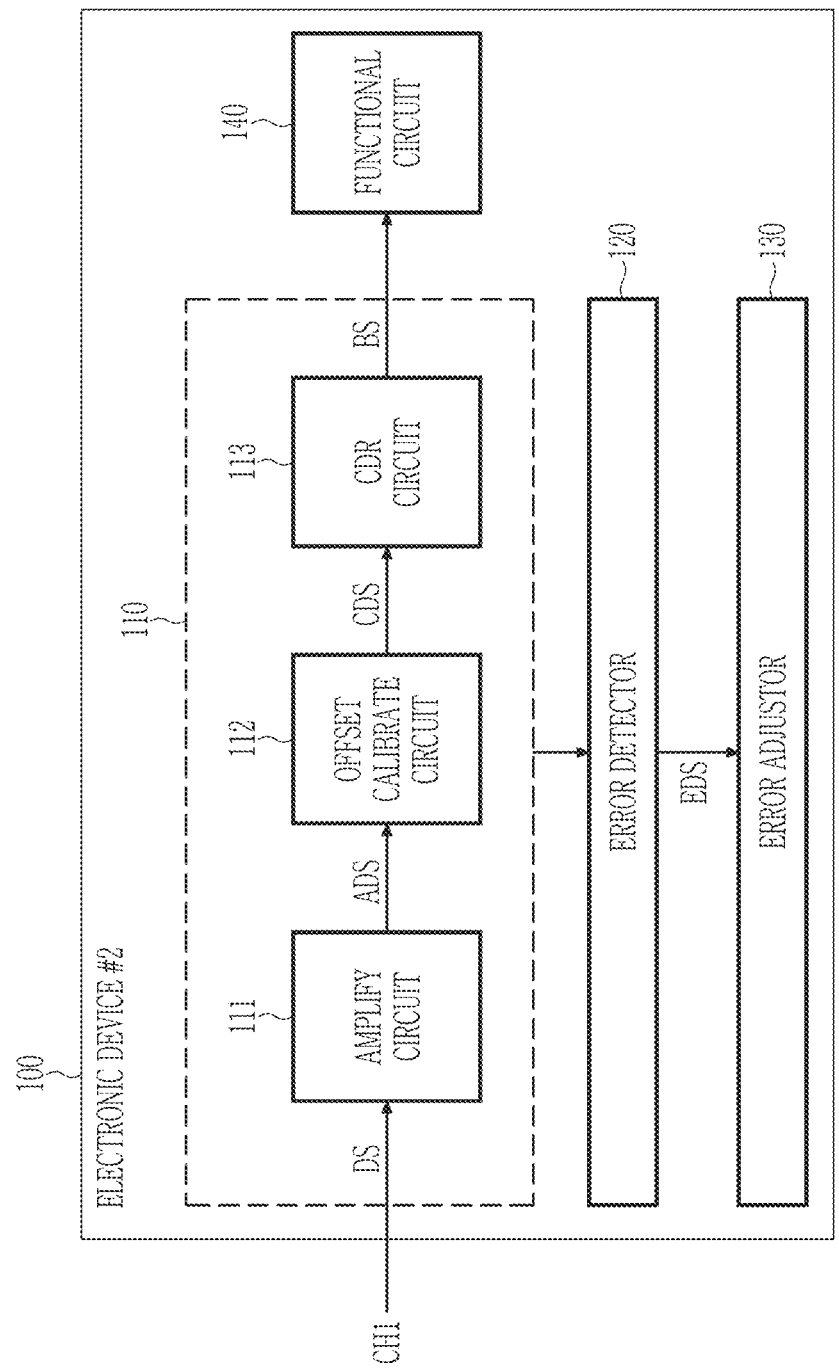
FIG. 3 is a view showing a second electronic device of FIG. 1 in more detail.

FIG. 3 is a view showing the second electronic device of FIG. 1 in more detail. Referring to FIGS. 1 to 3, the second electronic device 100 may include a reception driver 110, the error detector 120, the error adjuster 130, and a functional circuit 140.

The reception driver 110 may include the amplify circuit 111, an offset calibrate circuit 112, and a clock and data recovery (CDR) circuit 113.

The amplify circuit 111 may receive the data signal DS having a differential voltage form through the first channel CH1. The amplify circuit 111 may attenuate or amplify the data signal DS for each frequency component. For example, the amplify circuit 111 may include the CTLE circuit.

In some implementations, the amplify circuit 111 may generate the amplified data signal ADS by amplifying a high-frequency component of the data signal DS and attenuating a low-frequency component of the data signal DS. That is, the amplify circuit 111 may be operated as a differential amplifier operated based on the data signal DS. However, the scope of the present disclosure is not limited to a specific operation method of the amplify circuit 111.

In some implementations, the error adjuster 130 may adjust the voltage gain of the amplify circuit 111. For example, similar to the description provided with reference to FIG. 2B, the error adjuster 130 may adjust the voltage gain of the amplify circuit 111 through the gain control signal GCS. The description describes a specific method of adjusting the voltage gain of the amplify circuit 111 in more detail with reference to FIG. 10 below.

The offset calibrate circuit 112 may receive the amplified data signal ADS from the amplify circuit 111. The offset calibrate circuit 112 may generate a calibrated data signal CDS by adjusting an offset of the amplified data signal ADS. In this case, an amplitude of the calibrated data signal CDS may have a uniform magnitude compared to an amplitude of the amplified data signal ADS.

In some implementations, a calibration value of the offset calibrate circuit 112 that is used to adjust the offset of the amplified data signal ADS may be determined in a phase of training the first electronic device 10 and the second electronic device 100. However, the scope of the present disclosure is not limited thereto.

The CDR circuit 113 may receive the calibrated data signal CDS and generate a bitstream BS. That is, the CDR circuit 113 may generate the bitstream BS, which is a digital signal, based on the calibrated data signal CDS, which is an analog signal.

The functional circuit 140 may receive the bitstream BS. The functional circuit 140 may be operated based on the bitstream BS. For example, the functional circuit 140 may include a display panel outputting an image corresponding to the bitstream BS when the second electronic device 100 is the display device.

The error detector 120_1 may determine whether the error occurs in an operation of the reception driver 110. For example, the error detector 120 may determine whether the reception driver 110 is normally operated (that is, whether the bitstream BS is normally generated) by determining whether the error is included in an internal signal of the reception driver 110. The error detector 120 may generate the error detection signal EDS based on a determination result.

In some implementations, the error detector 120 may determine whether the error occurs in the operation of the reception driver 110 by determining whether noise of a certain magnitude or more is included in the internal signal of the reception driver 110. More details of the more specific configuration and operation of the error detector 120 follow hereinafter.

In some implementations, noise may be included in the data signal DS, or noise may be included in the signal transferred between the components of the second electronic device 100, when the second electronic device 100 is exposed to an electromagnetic wave having a specific intensity or frequency (for example, when another electronic device approaches the second electronic device 100). Therefore, the error detector 120 may determine whether the reception driver 110 is normally operated (e.g., whether the bitstream BS is normally generated) based on various types of internal signals of the reception driver 110. In some implementations, the error detector 120 determines whether the error occurs in the operation of the reception driver 110 based on various internal signals of the reception driver 110 with reference to FIGS. 4A to 7 below.

The error adjuster 130 may reduce the influence of noise by adjusting the voltage swing width of the data signal DS based on the error detection signal DS (for example, similar to the example described with reference to FIG. 2A). Alternatively, the error adjuster 130 may reduce the influence of noise by adjusting the voltage gain of the amplify circuit 111 based on the error detection signal DS (for example, similar to the example described with reference to FIG. 2B). In some implementations, the error adjuster 130 operates based on the error detection signal DS with reference to FIGS. 2A and 2B, and thus repeated description is omitted.

In some implementations, the error adjuster 130 may reduce the influence of noise by adjusting the voltage swing width of the data signal DS and the voltage gain of the amplify circuit 111. In some implementations, the error adjuster 130 controls both the voltage swing width of the data signal DS and the voltage gain of the amplify circuit 111. More detail will follow with reference to FIGS. 12 to 14 below.

Figure 4A:
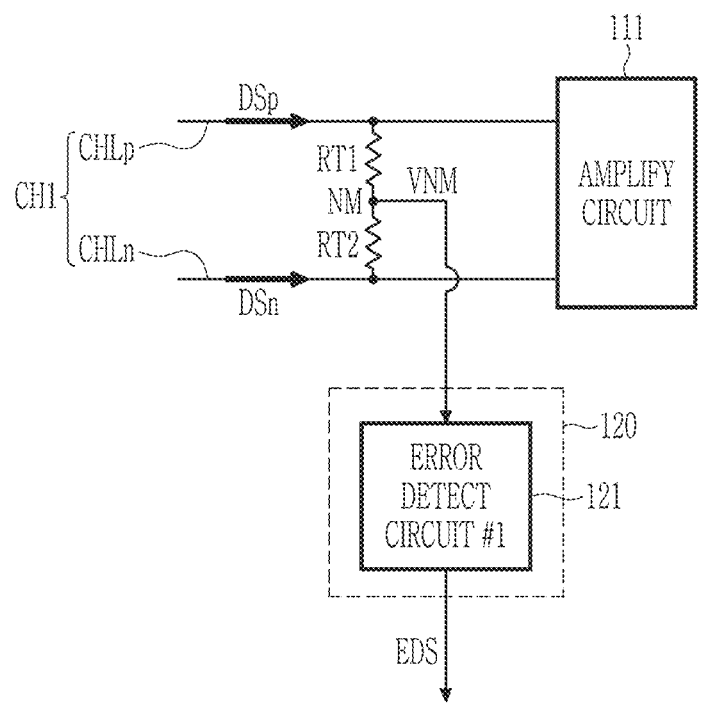
FIGS. 4A and 4B are views each showing an operation of an error detector of FIG. 3.
Figure 4B:
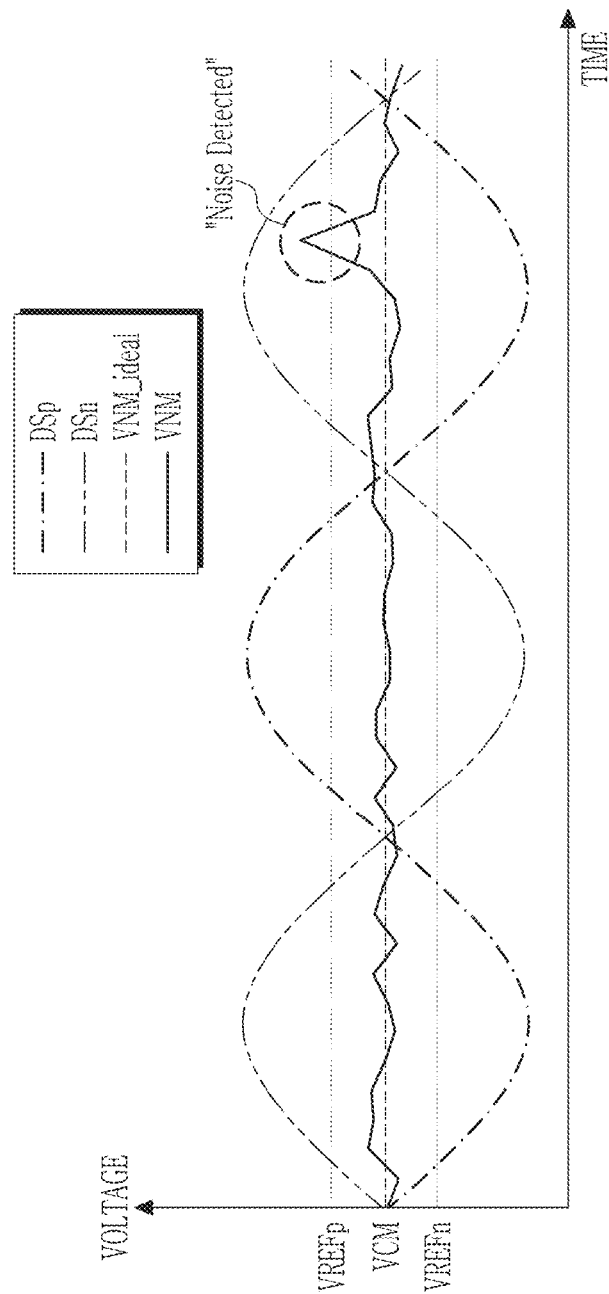

FIGS. 4A and 4B are each views showing the operation of the error detector of FIG. 3. First, referring to FIGS. 1 to 3 and 4A, the first channel CH1 may include a non-inverted channel line CHLp and an inverted channel line CHLn. The non-inverted channel line CHLp may transfer a non-inverted data signal DSp, and the inverted channel line CHLn may transfer an inverted data signal DSn. That is, the data signal DS may be a differential signal including the non-inverted data signal DSp and the inverted data signal DSn having phases complementary to each other.

A first terminal resistor RT1 and a second terminal resistor RT2 may be connected in series with each other between the non-inverted channel line CHLp and the inverted channel line CHLn. For example, the first terminal resistance RT1 may be connected between an intermediate node NM and the non-inverted channel line CHLp, and the second terminal resistance RT2 may be connected between the intermediate node NM and the inverted channel line CHLn.

The first terminal resistor RT1 and the second terminal resistor RT2 may have the same resistance value. In this case, a voltage level of the intermediate node NM (hereinafter, an intermediate-node voltage level VNM) may be determined as an average of a voltage level of the non-inverted data signal DSp and a voltage level of the inverted data signal DSn. Therefore, the intermediate-node voltage level VNM may be constant when noise is not included in the non-inverted data signal DSp and the inverted data signal DSn having the phases complementary to each other.

The error detector 120 may include a first error detection circuit 121. The first error detection circuit 121 may determine whether the error occurs in the operation of the second electronic device 100 based on the intermediate-node voltage level VNM. For example, the first error detection circuit 121 may determine whether the intermediate-node voltage level VNM is constant. In more detail, the first error detection circuit 121 may determine whether the intermediate-node voltage level VNM is out of a reference voltage level range.

In some implementations, the first error detection circuit 121 may output the error detection signal EDS indicating the logic high when the intermediate-node voltage level VNM is out of the reference voltage level range. On the other hand, the first error detection circuit 121 may output the error detection signal EDS indicating the logic low when the intermediate-node voltage level VNM is not out of the reference voltage level range.

FIG. 4B shows in more detail the operation of the first error detection circuit for the intermediate-node voltage level of FIG. 4A. In FIG. 4B, a horizontal axis represents time, and a vertical axis represents a voltage level.

Referring to FIGS. 1 to 4B, the non-inverted data signal DSp is shown as an alternate long and short dash line, and the inverted data signal DSn is shown as an alternate long and two short dashes line. The non-inverted data signal DSp and the inverted data signal DSn may have the voltage levels complementary to each other.

In this example, the non-inverted data signal DSp and the inverted data signal DSn shown in FIG. 4B are the data signals DS transferred by a first electronic device 10 through the first channel CH1.

The first terminal resistor RT1 and the second terminal resistor RT2 may have the same resistance value. In this case, the intermediate-node voltage level VNM may be determined as the average of the voltage level of the non-inverted data signal DSp and the voltage level of the inverted data signal DSn. Therefore, an ideal intermediate-node voltage level VNM_ideal may be constant. For example, the ideal intermediate-node voltage level VNM_ideal may be constant as a "VCM". The ideal intermediate-node voltage level VNM_ideal is shown as a dotted line.

However, various types of noise may be included in the non-inverted data signal DSp and the inverted data signal DSn. In this case, the intermediate-node voltage level VNM may not be constant. For example, the intermediate-node voltage level VNM may be higher or lower than the "VCM". The intermediate-node voltage level VNM is depicted as a solid line.

In particular, relatively large noise may be included in the non-inverted data signal DSp and the inverted data signal DSn when a sudden disturbance occurs from the outside of the communication system (for example, when another electronic device approaches the second electronic device 100). In this case, the intermediate-node voltage level VNM may be much higher or much lower than the "VCM".

The first error detection circuit 121 may determine whether the intermediate-node voltage level VNM is out of the reference voltage level range. In this case, the reference voltage level range may be a section between a first reference voltage level VREFp and a second reference voltage level VREFn. That is, the first error detection circuit 121 may determine whether the intermediate-node voltage level VNM is increased to be higher than the first reference voltage level VREFp or reduced to be lower than the second reference voltage level VREFn.

For example, the first error detection circuit 121 may detect noise included in the non-inverted data signal DSp and the inverted data signal DSn when the intermediate-node voltage level VNM is higher than the first reference voltage level VREFp. That is, the first error detection circuit 121 may determine that the error occurs in the operation of the reception driver 110 based on the data signal DS. In this case, the first error detection circuit 121 may output the error detection signal EDS indicating the logic high.

Figure 5A:
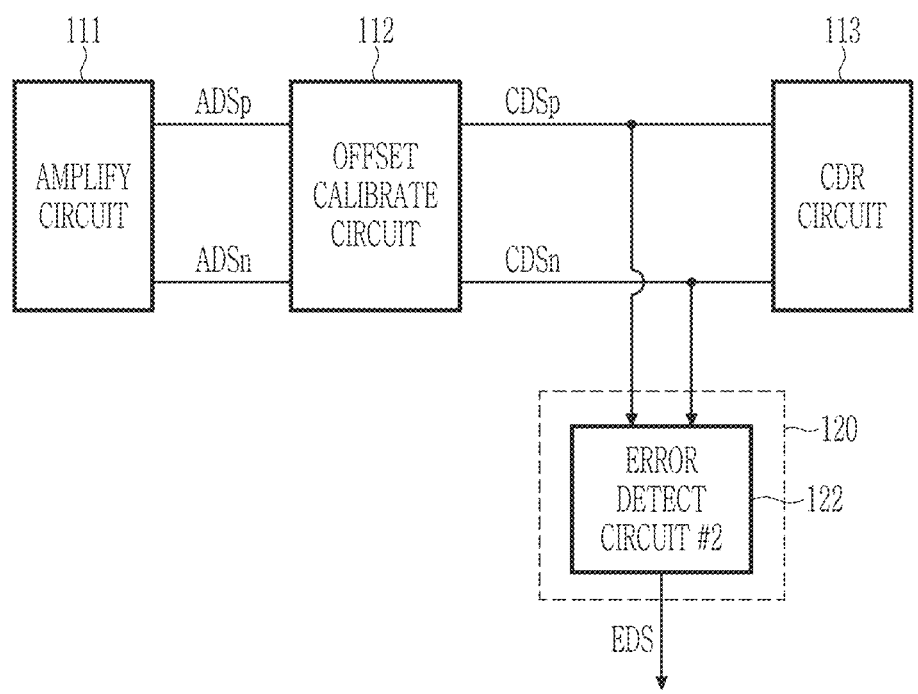
FIGS. 5A and 5B are views each showing an operation of the error detector of FIG. 3.
Figure 5B:
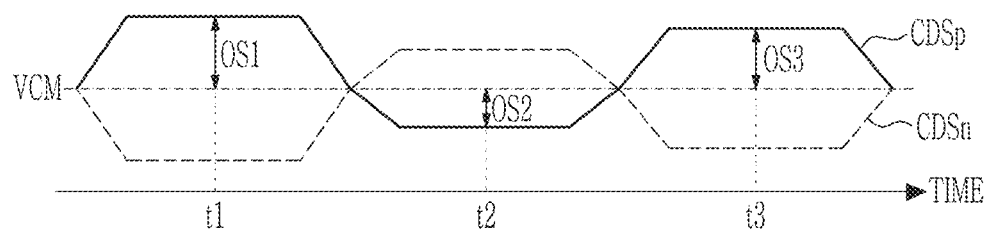

FIGS. 5A and 5B are views each showing the operation of the error detector of FIG. 3. First, referring to FIGS. 1 to 3 and 5A, the amplify circuit 111 may provide the offset calibrate circuit 112 with a non-inverted amplified data signal ADSp and an inverted amplified data signal ADSn. That is, the amplified data signal ADS may be a differential signal including the non-inverted amplified data signal ADSp and the inverted amplified data signal ADSn having phases complementary to each other.

The offset calibrate circuit 112 may calibrate offsets of the non-inverted amplified data signal ADSp and the inverted amplified data signal ADSn. For example, the offset calibrate circuit 112 may uniformly adjust the offsets of the non-inverted amplified data signal ADSp and the inverted amplified data signal ADSn to respectively generate a non-inverted calibrated data signal CDSp and an inverted calibrated data signal CDSn. That is, the calibrated data signal CDS may be a differential signal including the non-inverted calibrated data signal CDSp and the inverted calibrated data signal CDSn having phases complementary to each other.

The offset calibrate circuit 112 may provide the CDR circuit 113 with the non-inverted calibrated data signal CDSp and the inverted calibrated data signal CDSn.

The error detector 120 may include a second error detection circuit 122. The second error detection circuit 122 may determine whether the disturbance occurs in the operation of the second electronic device 100 based on the non-inverted calibrated data signal CDSp and the inverted calibrated data signal CDSn. For example, the second error detection circuit 122 may determine whether offsets of the non-inverted calibrated data signal CDSp and the inverted calibrated data signal CDSn are greater than a reference voltage.

FIG. 5B shows the operation of the second error detection circuit of FIG. 5A. In FIG. 5B, a horizontal axis represents time, and a vertical axis represents a voltage level.

Referring to FIGS. 1 to 3 and 5B, the calibrated data signal CDS may include the non-inverted calibrated data signal CDSp and the inverted calibrated data signal CDSn. The non-inverted calibrated data signal CDSp is shown as a solid line, and the inverted calibrated data signal CDSn is shown as a dotted line.

An offset of the calibrated data signal CDS may represent a voltage level difference between the "VCM" and the non-inverted calibrated data signal CDSp. An offset magnitude of the calibrated data signal CDS may not be constant. That is, the offset magnitude of the calibrated data signal CDS may be different at different times. For example, an offset of the calibrated data signal CDS at a first time point t1 may be "OS1", an offset of the calibrated data signal CDS at a second time point t2 may be "OS2", and an offset of the calibrated data signal CDS at a third time point t3 may be "OS3".

In some implementations, the "VCM" may correspond to an average voltage of the non-inverted calibrated data signal CDSp and the inverted calibrated data signal CDSn. A voltage level corresponding to the "VCM" is shown as a horizontal dashed line.

The second error detection circuit 122 may measure the offset of the calibrated data signal CDS based on the non-inverted calibrated data signal CDSp and the inverted calibrated data signal CDSn. The second error detection circuit 122 may output the error detection signal EDS indicating the logic high when the measured offset is greater than the reference voltage. On the other hand, the second error detection circuit 122 may output the error detection signal EDS indicating the logic low when the measured offset is less than the reference voltage.

Figure 6:
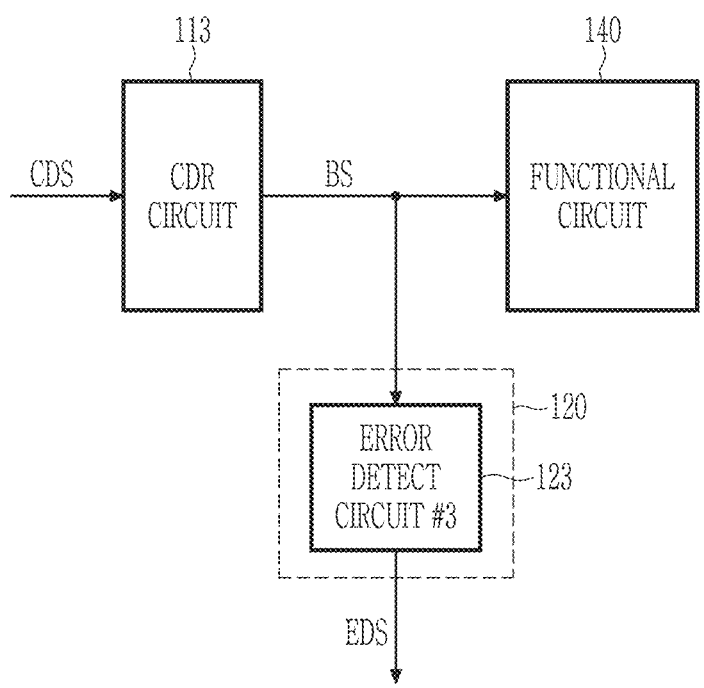
FIG. 6 is a view showing an operation of the error detector of FIG. 3.

FIG. 6 is a view showing the operation of the error detector of FIG. 3. Referring to FIGS. 1 to 3 and 6, the CDR circuit 113 may receive the calibrated data signal CDS. The CDR circuit 113 may generate the bitstream BS based on the calibrated data signal CDS.

The error detector 120 may include a third error detection circuit 123. The third error detection circuit 123 may determine whether the disturbance occurs in the operation of the second electronic device 100 based on the bitstream BS. For example, the third error detection circuit 123 may measure a bit error rate (BER) of the bitstream BS. The third error detection circuit 123 may determine whether the bit error rate of the bitstream BS is greater than a reference value.

The third error detection circuit 123 may output the error detection signal EDS indicating the logic high when the measured bit error rate is greater than the reference value. On the other hand, the third error detection circuit 123 may output the error detection signal EDS indicating the logic low when the measured bit error rate is less than the reference value.

In this example, the error detector 120 includes one of the first to third error detection circuits 121 to 123 with reference to FIGS. 4A to 7, and the scope of the present disclosure is not limited thereto. For example, the error detector 120 may include two error detection circuits of the first to third error detection circuits 121 to 123 or may include all of the first to third error detection circuits 121 to 123. In some implementations, the error detector 120 includes all of the first to third error detection circuits 121 to 123. More details will follow with reference to FIG. 7 below.

Figure 7:
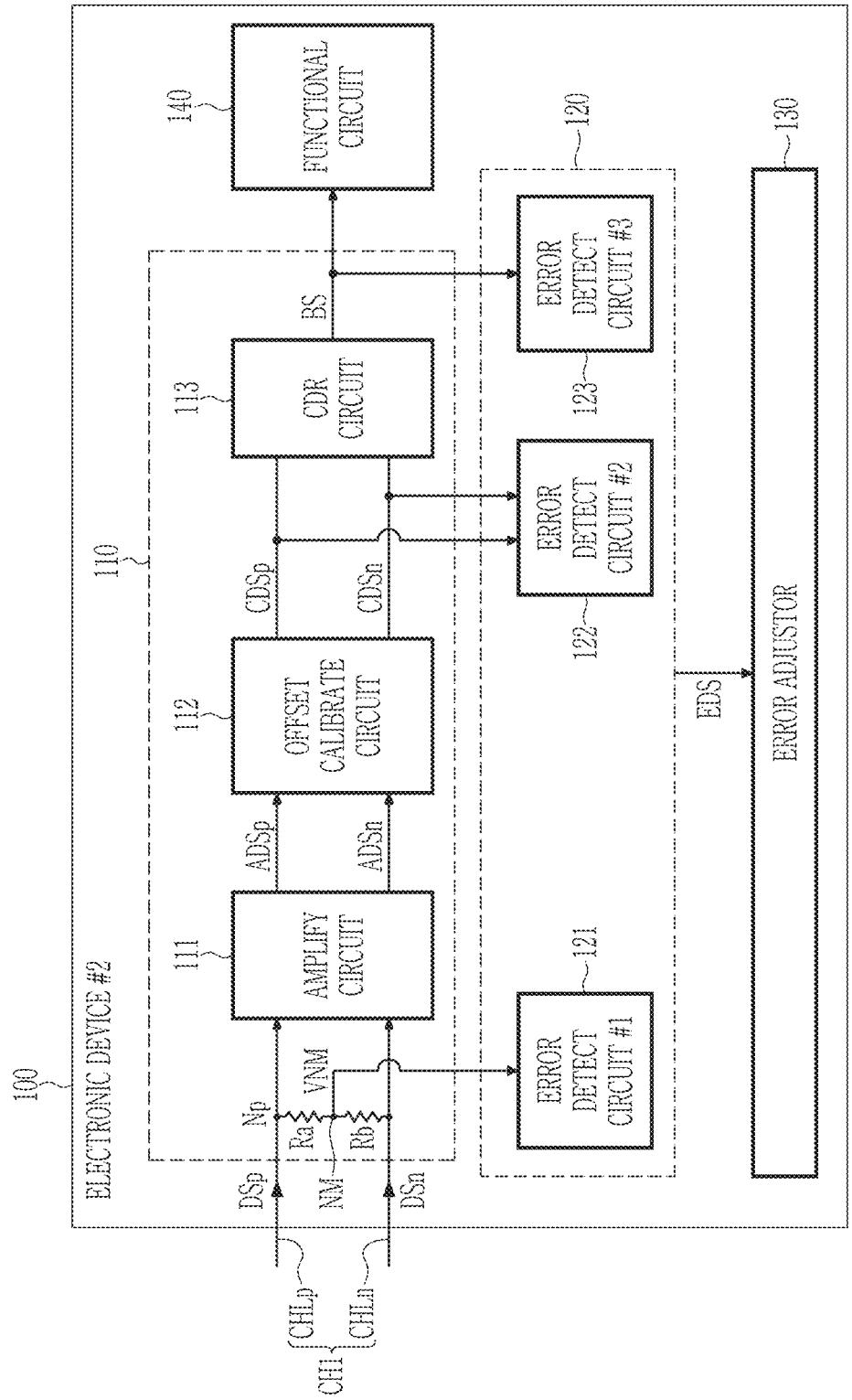
FIG. 7 is a view showing an operation of the error detector of FIG. 3.

FIG. 7 is a view showing the operation of the error detector of FIG. 3. Referring to FIGS. 1 to 7, the error detector 120 includes the first to third error detection circuits 121 to 123. The configuration and operation of each of the reception driver 110 and the first to third error detection circuits 121 to 123 are similar to those described above, and thus repeated description is omitted.

The error detector 120 may provide the error adjuster 130 with the error detection signal EDS. In this case, the error detection signal EDS may indicate the logic high when at least one of the first to third error detection circuits 121 to 123 determines that the error occurs in the operation of the reception driver 110. In other words, the error detection signal EDS may indicate the logic low only when none of the first to third error detection circuits 121 to 123 detects the error occurring in the operation of the reception driver 110.

That is, in the example of FIG. 7, the error detector 120 may accurately detect the error in the operation of the reception driver 110. In this case, the error adjuster 130 may be operated more accurately, thus improving immunity of the second electronic device 100 to noise.

Figure 8A:
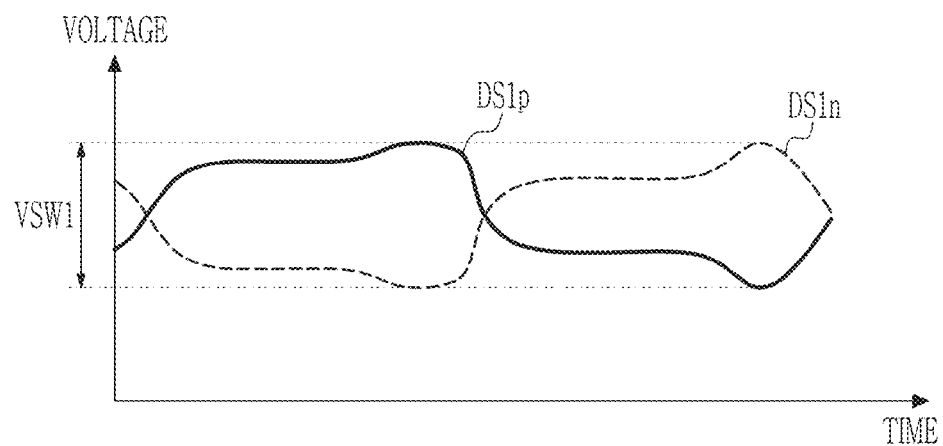
FIGS. 8A and 8B are views each showing a data signal according to the example of FIG. 2A.
Figure 8B:
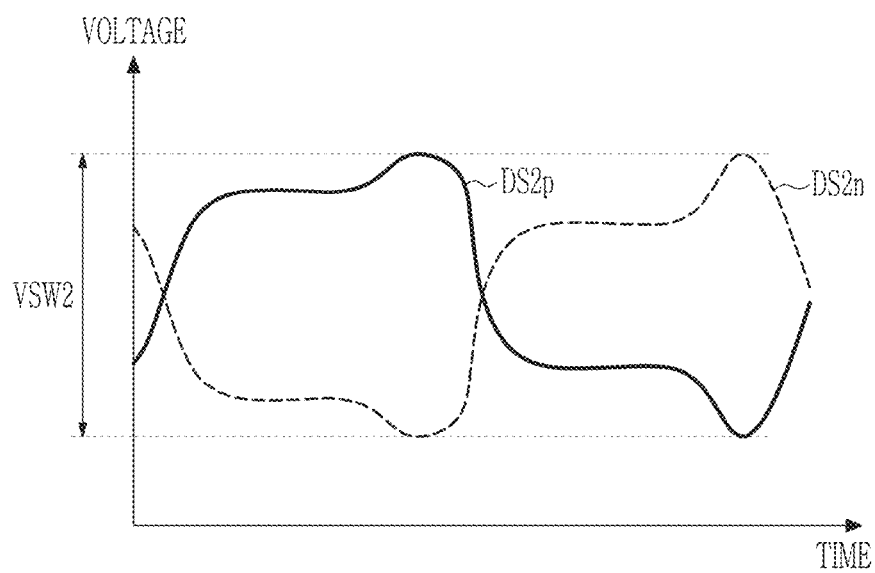

FIGS. 8A and 8B are views each showing a data signal according to the example of FIG. 2A. In FIGS. 8A and 8B, a horizontal axis represents time, and a vertical axis represents a voltage level. In this example, the first electronic device 10_1 sequentially provides the second electronic device 100_1 with a first data signal DS1 and a second data signal DS2 with reference to FIGS. 1, 2A, 8A and 8B.

First, referring to FIGS. 1, 2A, and 8A, the first data signal DS1 may include a first non-inverted data signal DS1$p$ and a first inverted data signal DS1$n$. Each voltage swing width of the first non-inverted data signal DS1$p$ and the first inverted data signal DS1$n$ may be a first voltage swing width VSW1. For example, the voltage level of the first non-inverted data signal DS1$p$ may be changed by the first voltage swing width VSW1 to represent a different logic level. Similarly, the voltage level of the first inverted data signal DS1$n$ may be changed by the first voltage swing width VSW1 to represent a different logic level.

On the other hand, referring to FIGS. 1, 2A, and 8B, the second data signal DS2 may include a second non-inverted data signal DS2$p$ and a second inverted data signal DS2$n$. Each voltage swing width of the second non-inverted data signal DS2$p$ and the second inverted data signal DS2$n$ may be a second voltage swing width VSW2. For example, the voltage level of the second non-inverted data signal DS2$p$ may be changed by the second voltage swing width VSW2 to represent a different logic level. Similarly, the voltage level of the second inverted data signal DS2$n$ may be changed by the second voltage swing width VSW2 to represent a different logic level.

In some implementations, the second voltage swing width VSW2 may be greater than the first voltage swing width VSW1. That is, a voltage level swing of the second non-inverted data signal DS2$p$ may be greater than a voltage level swing of first non-inverted data signal DS1$p$ even when the first data signal DS1 and the second data signal DS2 have the same logic level. In this case, the second electronic device 100_1 operated in response to the second data signal DS2 may have improved immunity to noise.

In some implementations, the second voltage swing width VSW2 may be less than the first voltage swing width VSW1. That is, the voltage level swing of the second non-inverted data signal DS2$p$ may be less than the voltage level swing of first non-inverted data signal DS1$p$ even when the first data signal DS1 and the second data signal DS2 have the same logic level. In this case, the second electronic device 100_1 operated in response to the second data signal DS2 may have the minimum power consumption and the minimum vulnerability to the EMI.

Figure 9:
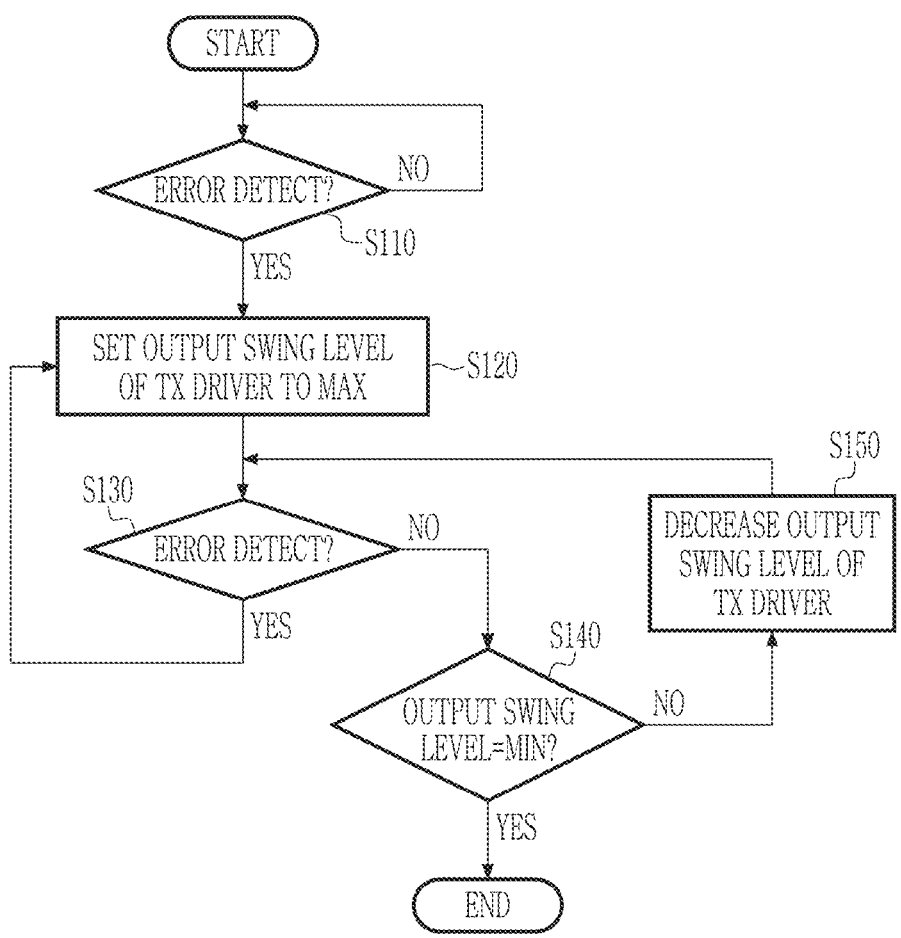
FIG. 9 is a flowchart showing an example of an operation of the second electronic device from FIG. 2A.

FIG. 9 is a flowchart showing the operation of the second electronic device from FIG. 2A. Hereinafter, for a more brief description, it is assumed that following steps S110 to S150 are performed after the output swing level of the first electronic device 10_1 is set to the minimum. However, the scope of the present disclosure is not limited thereto.

Referring to FIGS. 1, 2A, and 9, in the step S110, the second electronic device 100_1 may determine whether the error occurs. For example, the error detector 120 may generate the error detection signal EDS by determining whether the error occurs in the operation of the reception driver 110 in response to the data signal DS (that is, its operation of generating the bitstream).

The step S110 may be repeatedly performed the error detector 120_1 determines that no error occurs in the step S110. That is, when no error is detected in the operation of the reception driver 110, the second electronic device 100_1 may continuously receive the data signal DS while maintaining the output swing level of the transmission driver 11_1 included in the first electronic device 10_1 to the minimum. In this case, the voltage swing width of the data signal DS may be reduced, thus reducing the power consumption of the second electronic device 100_1.

The following step S120 may be performed when the error detector 120_1 determines that the error occurs in the step S110.

In the step S120, the second electronic device 100_1 may set the output swing level of the transmission driver 11_1 to the maximum. For example, the error adjuster 130_1 may set the output swing level of the transmission driver 11_1 to the upper limit value by providing the swing controller 12_1 with the control signal CS through the second channel CH2. In this case, the voltage swing width of the data signal DS output by the transmission driver 11_1 through the first channel CH1 may be increased to the maximum (that is, the upper limit value). Accordingly, the second electronic device 100_1 may have the increased immunity to noise.

In the step S130, the second electronic device 100_1 may determine whether the error occurs. An operation of the second electronic device 100_1 in the step S130 is similar to the operation of the second electronic device 100_1 in the step S110 described above, and repeated description is omitted.

The following step S120 may be repeatedly performed when the error detector 120_1 determines that the error occurs in the step S130. That is, in some implementations, the output swing level of the transmission driver 11_1 may be maintained as the upper limit value when the error occurs in the operation of the second electronic device 100_1 due to noise caused by the external influence. In this case, the voltage swing width of the data signal DS output by the transmission driver 11_1 through the first channel CH1 may be maintained to the maximum (that is, the upper limit value). Therefore, the influence of noise on the second electronic device 100_1 may be reduced until noise caused by the external influence is reduced.

The following step S140 may be performed when the error detector 120_1 determines that no error occurs in the step S130.

In the step S140, the second electronic device 100_1 may determine whether the output swing level of the transmission driver 11_1 is the minimum. That is, the second electronic device 100_1 may determine whether the output swing level of the transmission driver 11_1 is already the lower limit value.

The following step S150 may be performed when the second electronic device 100_1 determines that the output swing level of the transmission driver 11_1 is not the minimum in the step S140.

In the step S150, the second electronic device 100_1 may reduce the output swing level of the transmission driver 11_1. For example, the error adjuster 130_1 may reduce the output swing level of the transmission driver 11_1 by providing the swing controller 12_1 with the control signal CS through the second channel CH2. In this case, it is possible to reduce the voltage swing width of the data signal DS output by the transmission driver 11_1 through the first channel CH1.

The step S130 described above may be repeatedly performed after the step S150 is performed. That is, the second electronic device 100_1 may continuously reduce the output swing level of the transmission driver 11_1 as long as no error occurs in the operation of the reception driver 110_1 (that is, there is no disturbance from the outside) until the output swing level of the transmission driver 11_1 is reduced to the minimum value (that is, until the second electronic device 100_1 has the minimum power consumption). Therefore, the voltage swing width of the data signal DS may be reduced when no error occurs in the operation of the reception driver 110_1, thus reducing the power consumption of the second electronic device 100_1.

In the step S140, the operation of the second electronic device 100_1 may be ended when the second electronic device 100_1 determines that the output swing level of the transmission driver 11_1 is already the minimum value. However, the scope of the present disclosure is not limited thereto, and the second electronic device 100_1 may repeatedly perform the steps S110 to S150 described above when the second electronic device 100_1 determines that the output swing level of the transmission driver 11_1 is already the minimum value in the step S140. In this case, the output swing level of the transmission driver 11_1 may be adaptively adjusted, thus reducing the power consumption of the second electronic device 100_1 while maximizing the immunity of the second electronic device 100_1 to the signal disturbance from the outside.

Figure 10:
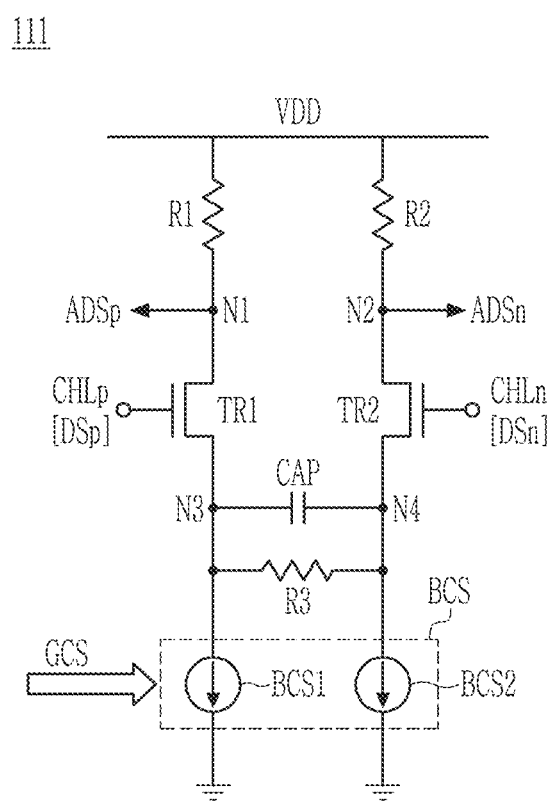
FIG. 10 is a view showing an amplify circuit from FIG. 2B.

FIG. 10 is a view showing the amplify circuit of FIG. 2B. In this example, the amplify circuit 111 is implemented as the continuous time linear equalization (CTLE) circuit with reference to FIG. 10. However, the scope of the present disclosure is not limited thereto, and the amplify circuit 111 may be implemented as any type of amplifier.

Referring to FIGS. 1, 2B, and 10, the amplify circuit 111 may include a first transistor TR1, a second transistor TR2, a first resistor R1, a second resistor R2, a third resistor R3, a capacitor CAP, and a bias current source BCS.

The first transistor TR1 may be connected between a first node N1 and a third node N3. The second transistor TR2 may be connected between a second node N2 and a fourth node N4. Gate terminals of the first transistor TR1 and the second transistor TR2 may be connected to the first channel CH1.

The first transistor TR1 may be operated based on a voltage level of the non-inverted channel line CHLp (that is, the voltage level of the non-inverted data signal DSp). The second transistor TR2 may be operated based on a voltage level of the inverted channel line CHLn (that is, the voltage level of the inverted data signal DSn).

The first node N1 and the second node N2 may be connected with the offset calibrate circuit 112. The first node N1 may output the non-inverted amplified data signal ADSp. The second node N2 may output the non-inverted amplified data signal ADSn.

A relationship between the amplify circuit 111 and the data signal DS and a relationship between the amplify circuit 111 and the amplified data signal ADS are similar to those described above with reference to FIGS. 4A and 5A, and the description thus omits their details.

The first resistor R1 may be connected between a power supply voltage VDD and the first node N1. The second resistor R2 may be connected between the power supply voltage VDD and the second node N2. The first resistor R1 and the second resistor R2 may have resistances of the same magnitude. However, the scope of the present disclosure is not limited thereto.

The third resistor R3 and the capacitor CAP may be connected between the third node N3 and the fourth node N4.

The bias current source BCS may include a first bias current source BCS1 and a second bias current source BCS2. The first bias current source BCS1 may be connected between the third node N3 and a ground voltage. The second bias current source BCS2 may be connected between the fourth node N4 and the ground voltage.

The error adjuster 130_2 may control a magnitude of the bias current source BCS through the gain control signal GCS. That is, the error adjuster 130_2 may adjust a magnitude of the first bias current source BCS1 or a magnitude of the second bias current source BCS2 through the gain control signal GCS.

A drain current of the first transistor TR1 may change when the magnitude of the first bias current source BCS1 changes. In this case, a trans-conductance of the first transistor TR1 may change.

Similarly, a drain current of the second transistor TR2 be change when the magnitude of the second bias current source BCS2 changes. In this case, a trans-conductance of the second transistor TR2 may changed.

The voltage gain of the amplify circuit 111 may change when the trans-conductances of the first transistor TR1 or the second transistor TR2 changes.

As a more detailed example, the trans-conductances of the first transistor TR1 and the second transistor TR2 may increase when the magnitudes of the first bias current source BCS1 and the second bias current source BCS2 increase in response to the gain control signal GCS. In this case, a coefficient of a transfer function of the amplify circuit 111 may increase. Accordingly, the voltage gain of the amplify circuit 111 may increase.

That is, in some implementations, the voltage gain of the amplify circuit 111 may be adjusted in response to control of the error adjuster 130_2. In this case, a magnitude of an internal signal of the reception driver 110_2 may adaptively adjust based on whether the error occurs in the operation of the second electronic device 100_2 due to the signal disturbance from the outside. Accordingly, in some implementations, it is possible to reduce the power consumption of the second electronic device 100_2 while maximizing the immunity of the second electronic device 100_2 to the signal disturbance from the outside.

In this example, the amplify circuit 111 is implemented as an active continuous time linear equalization (CTLE) circuit with reference to FIG. 10, but the scope of the present disclosure is not limited thereto. For example, the amplify circuit 111 may be implemented as any type of amplifier or may further include any type of amplifier. That is, the scope of the present disclosure is not limited to a specific implementation method of the amplify circuit 111.

Figure 11:
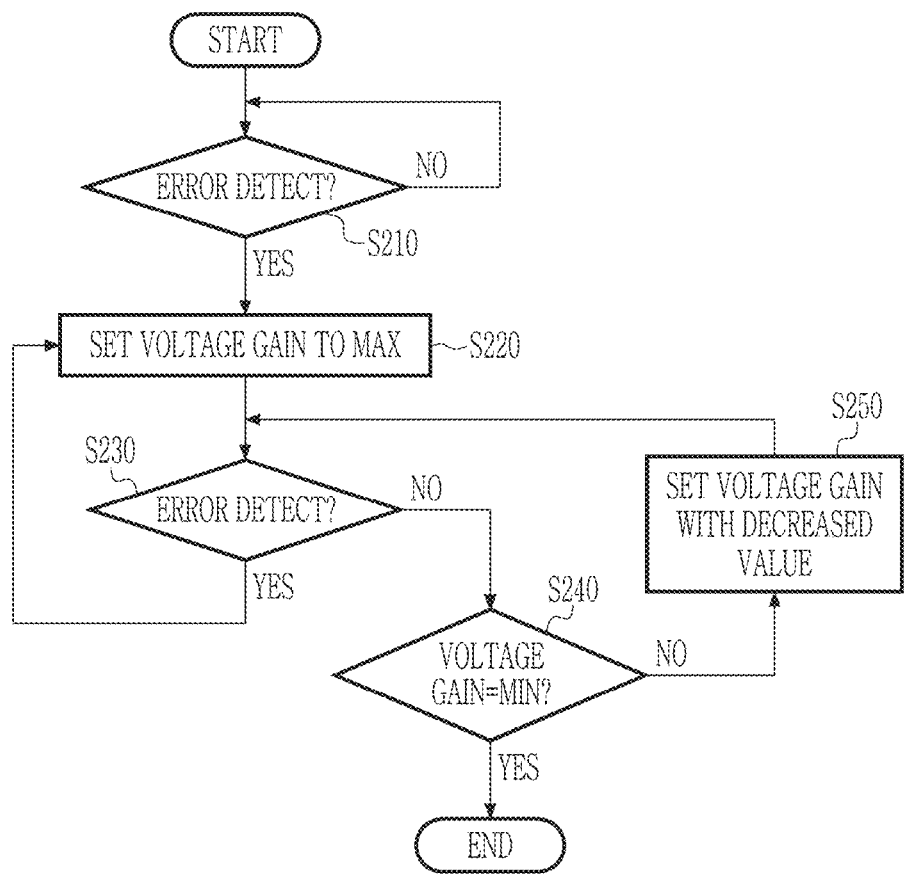
FIG. 11 is a flowchart showing an example of an operation of the second electronic device of FIG. 2B.

FIG. 11 is a flowchart showing the operation of the second electronic device of FIG. 2B. In this example, steps S210 to S250 are performed after the voltage gain of the amplify circuit 111 is set to the minimum. However, the scope of the present disclosure is not limited thereto.

Referring to FIGS. 1, 2B, 10, and 11, in the step S210, the second electronic device 100_2 determines whether the error occurs. An operation of the second electronic device 100_2 in the step S210 is similar to the operation of the second electronic device 100_1 in the step S110 described above, and repeated description is omitted.

The following step S210 may be repeatedly performed when the error detector 120_2 determines that no error occurs in the step S210. That is, the second electronic device 100_2 may continuously receive the data signal DS while maintaining the voltage gain of the amplify circuit 111 to the minimum. In this case, a magnitude (e.g., swing width) of the signal in the reception driver 110_2 may be reduced, thus reducing the power consumption of the second electronic device 100_2.

The following step S220 may be performed when the error detector 120_2 determines that the error occurs in the step S210.

In the step S220, the second electronic device 100_2 may set the voltage gain of the amplify circuit 111 to the maximum. For example, the error adjuster 130_2 may set the voltage gain of the amplify circuit 111 to the upper limit value by providing the amplify circuit 111 with the gain control signal GCS. In this case, the magnitude of the signal in the reception driver 110_2 may be increased to the maximum (that is, the upper limit value).

In some implementations, the error adjuster 130_2 may provide the amplify circuit 111 with the gain control signal GCS to thus set the magnitudes of the first and second bias current sources BCS1 and BCS2 of the amplify circuit 111 to the upper limit values. In this case, the voltage gain of the amplify circuit 111 may be changed to the upper limit value. However, the scope of the present disclosure is not limited thereto.

In the step S230, the second electronic device 100_2 may determine whether the error occurs. An operation of the second electronic device 100_2 in the step S230 is similar to the operation of the second electronic device 100_1 in the step S130 described above, and the description thus omits its details.

The following step S220 may be repeatedly performed when the error detector 120_2 determines that the error occurs in the step S230. That is, in some implementations, the voltage gain of the amplify circuit 111 may be maintained as the upper limit value when the error occurs in the operation of the second electronic device 100_2 due to noise caused by the external influence. In this case, the magnitude of the signal transferred between the components in the reception driver 110_2 may be maintained to the maximum (that is, the upper limit value). Therefore, the influence of noise on the second electronic device 100_2 may be reduced until noise caused by the external influence is reduced.

The following step S240 may be performed when the error detector 120_2 determines that no error occurs in the step S230.

In the step S240, the second electronic device 100_2 may determine whether the voltage gain of the amplify circuit 111 is the minimum. That is, the second electronic device 100_2 may determine whether the voltage gain of the amplify circuit 111 is the lower limit value.

The following step S250 may be performed when the second electronic device 100_2 determines that the voltage gain of the amplify circuit 111 is not the minimum in the step S240.

In the step S250, the second electronic device 100_2 may reduce the voltage gain of the amplify circuit 111. For example, the error adjuster 130_2 may reduce the voltage gain of the amplify circuit 111 by providing the amplify circuit 111 with the gain control signal GCS. In this case, the magnitude of the signal transferred between the components in the reception driver 110_2 may be reduced, thus reducing the power consumption of the second electronic device 100_2.

The step S230 described above may be repeatedly performed after the step S250 is performed. That is, the second electronic device 100_2 may continuously reduce the voltage gain of the amplify circuit 111 as long as no error occurs in the operation of the reception driver 110_2 (that is, there is no disturbance from the outside) until the voltage gain of the amplify circuit 111 is reduced to the minimum value (that is, until the second electronic device 100_2 has the minimum power consumption). Therefore, the magnitude of the signal transferred between the components in the reception driver 110_2 may be reduced when no error occurs in the operation of the reception driver 110_2, thus reducing the power consumption of the second electronic device 100_2.

The operation of the second electronic device 100_2 may be ended when it is determined that the voltage gain of the amplify circuit 111 is already the minimum value in the step S240. However, the scope of the present disclosure is not limited thereto, and the second electronic device 100_2 may repeatedly perform the steps S210 to S250 described above when it is determined that the voltage gain of the amplify circuit 111 is already the minimum value in the step S240. In this case, the voltage gain of the amplify circuit 111 may be adaptively adjusted, thus reducing the power consumption of the second electronic device 100_2 while maximizing the immunity of the second electronic device 100_2 to the signal disturbance from the outside.

Figure 12:
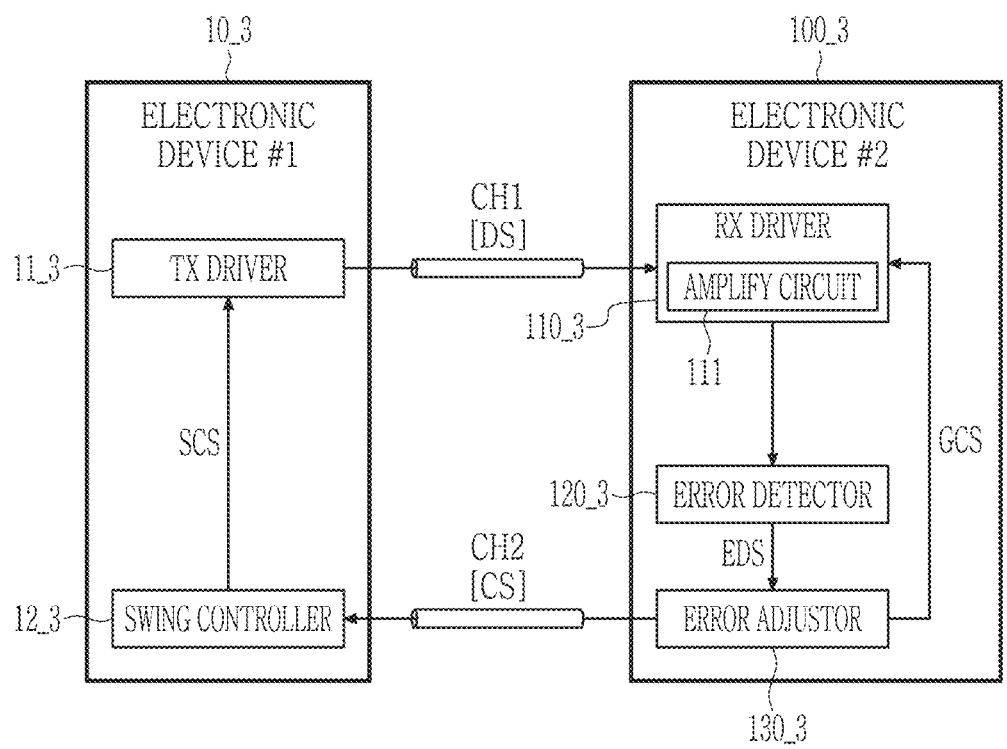
FIG. 12 is a view showing in more detail some configurations of the communication system of FIG. 1.

FIG. 12 is a view showing in more detail some configurations of the communication system of FIG. 1. In this example, the influence of noise is reduced by adjusting an output swing level of a transmission driver 11_3 and the voltage gain of the amplify circuit 111 with reference to FIG. 12.

Referring to FIGS. 1, 2A, 2B, and 12, a first electronic device 10_3 includes the transmission driver 11_3 and a swing controller 12_3. A second electronic device 100_3 may include a reception driver 110_3, an error detector 120_3, and an error adjuster 130_3. The configurations and operations of the transmission driver 11_3, the swing controller 12_3, and the reception driver 110_3 are similar to those described above with reference to FIGS. 1 to 12, and the description thus omits their details.

The error adjuster 130_3 may output the error detection signal EDS. For example, the error detector 120_3 may include one of the first to third error detection circuits 121 to 123 described above with reference to FIGS. 3 to 7. That is, the scope of the present disclosure is not limited to a specific operation method of the error detector 120_3.

The error adjuster 130_3 may receive the error detection signal EDS. The error adjuster 130_3 may control the output swing level of the transmission driver 11_3 and the voltage gain of the amplify circuit 111 based on the error detection signal EDS. For example, the error adjuster 130_3 may control the swing controller 12_3 through the second channel CH2. In addition, the error adjuster 130_3 may control the voltage gain of the amplify circuit 111 by providing the reception driver 110_2 with the gain control signal GCS. In this case, both the voltage swing width of the data signal DS output by the transmission driver 11_1 and a magnitude of an internal signal of the reception driver 110_3 may be adjusted.

The description describes the specific method of the error adjuster 130_3 controlling the output swing level of the transmission driver 11_1 and the voltage gain of the amplify circuit 111 with reference to FIGS. 2A to 2B, 8A to 8B, and 10, and thus repeated details are omitted.

The error adjuster 130_3 may increase the output swing level of the transmission driver 11_3 and the voltage gain of the amplify circuit 111 to the upper limit value when the error detection signal EDS indicates the logic high. In this case, both the voltage swing width of the data signal DS output by the transmission driver 11_3 and the magnitude of the internal signal of the reception driver 110_3 may be increased, thus reducing the influence of noise caused by the external influence of the communication system on the reception driver 110_3.

In some implementations, the error adjuster 130_3 may maintain the output swing level of the transmission driver 11_3 and the voltage gain of the amplify circuit 111 when the output swing level of the transmission driver 11_3 and the voltage gain of the amplify circuit 111 are the upper limit values and the error detection signal EDS indicates the logic high. That is, the error adjuster 130_3 may control the output swing level of the transmission driver 11_3 and the voltage gain of the amplify circuit 111 to be the upper limit values or less.

The error adjuster 130_3 may reduce the output swing level of the transmission driver 11_3 or the voltage gain of the amplify circuit 111 when the error detection signal EDS indicates the logic low. In this case, both the voltage swing width of the data signal DS output by the transmission driver 11_1 and the magnitude of the internal signal of the reception driver 110_3 may be reduced, thus reducing power consumption of the second electronic device 100_3 and vulnerability of the second electronic device 100_3 to the EMI.

In some implementations, the error adjuster 130_3 may alternately reduce the output swing level of the transmission driver 11_3 and the voltage gain of the amplify circuit 111 when the error detection signal EDS indicates the logic low. In some implementations, the error adjuster 130_3 alternately reduces the output swing level of the transmission driver 11_3 and the voltage gain of the amplify circuit 111 in more detail with reference to FIGS. 13 and 14 below.

In some implementations, the error adjuster 130_3 may maintain the output swing level of the transmission driver 11_3 and the voltage gain of the amplify circuit 111 when the output swing level of the transmission driver 11_3 and the voltage gain of the amplify circuit 111 are the lower limit values and the error detection signal EDS indicates the logic low. That is, the error adjuster 130_3 may control the output swing level of the transmission driver 11_3 and the voltage gain of the amplify circuit 111 to be the lower limit values or more.

That is, in some implementations, the output swing level of the transmission driver 11_3 and the voltage gain of the amplify circuit 111 may be adaptively adjusted based on whether the error is detected due to the external influence of the communication system. Therefore, in some implementations, it is possible to reduce the power consumption of the second electronic device 100_1 and the vulnerability of the second electronic device 100_1 to the EMI while reducing the influence of noise caused by the external influence of the communication system.

Figure 13:
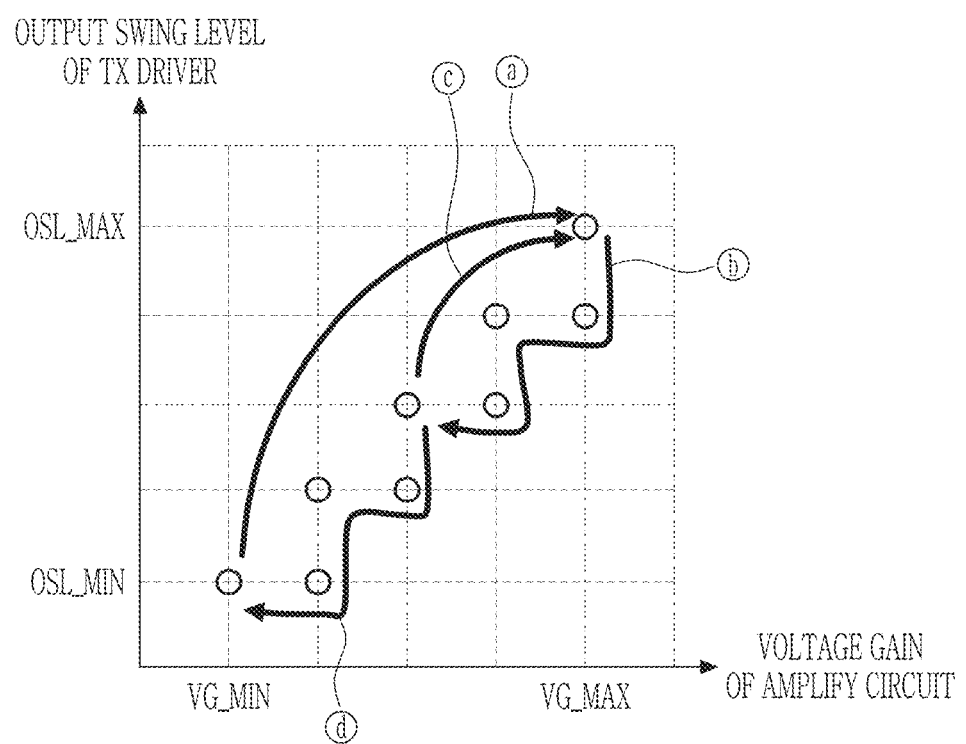
FIG. 13 is a view showing an operation of an error adjuster of FIG. 12.

FIG. 13 is a view showing an operation of an error adjuster of FIG. 12. In FIG. 13, a horizontal axis represents the voltage gain of the amplify circuit 111, and a vertical axis represents the output swing level of the transmission driver 11_3.

Referring to FIGS. 1, 2A, 2B, 12, and 13, the output swing level of the transmission driver 11_3 may be the minimum output swing level OSL_MIN, and the voltage gain of the amplify circuit 111 may be the minimum voltage gain VG_MIN in a state where the second electronic device 100_3 is normally operated (that is, a state where no signal disturbance occurs from the outside).

The error may then occur in an operation of the reception driver 110_3 when the signal disturbance occurs from the outside. In this case, the error detector 120_3 may generate the error detection signal EDS indicating logic high. The error adjuster 130_3 may increase the output swing level of the transmission driver 11_3 to the maximum output swing level OSL_MAX and increase the voltage gain of the amplify circuit 111 to the maximum voltage gain VG_MAX, in response to the error detection signal EDS (Sequence (a)).

The error adjuster 130_3 may alternately reduce the output swing level of the transmission driver 11_3 and the voltage gain of the amplify circuit 111 until the error detection signal EDS indicating the logic high is provided from the error detector 120_3 or the output swing level of the transmission driver 11_3 and the voltage gain of the amplify circuit 111 are reduced to the lower limit values (sequence (b) and sequence (d)).

In some implementations, when the second electronic device 100_3 is the display device, the error detector 120_3 may determine whether the error occurs in an operation of the transmission driver 11_3 whenever receiving data signals corresponding to different frame images are provided. That is, the error detector 120_3 may output different error detection signals EDS whenever the data signals corresponding to different frame image are provided.

In some implementations, when the second electronic device 100_3 is the display device, the error detector 120_3 may alternately reduce the output swing level of the transmission driver 11_3 and the voltage gain of the amplify circuit 111 whenever the data signals corresponding to different frame image are provided. For example, the error adjuster 130_3 may reduce the voltage gain of the amplify circuit 111 when the first data signal corresponding to a first frame image is provided through the first channel CH1 and no error occurs in the operation of the reception driver 110_3 in response to the first data signal. The error adjuster 130_3 may then reduce the output swing level of the transmission driver 11_3 when the second data signal corresponding to a second frame image is provided through the first channel CH1 and no error occurs in the operation of the reception driver 110_3 in response to the second data signal.

Meanwhile, the error detector 120_3 may detect whether the error occurs in an operation of the second electronic device 100_3 in a state where each of the output swing level of the transmission driver 11_3 and the voltage gain of the amplify circuit 111 is neither the upper limit value nor the lower limit value. The error detector 120_3 may generate the error detection signal EDS indicating the logic high when the error occurs in the operation of the second electronic device 100_3. In this case, the error adjuster 130_3 may increase the output swing level of the transmission driver 11_3 to the maximum output swing level OSL_MAX and increase the voltage gain of the amplify circuit 111 to the maximum voltage gain VG_MAX, in response to the error detection signal EDS (sequence (c)).

In this way, the second electronic device 100_3 may control the output swing level of the transmission driver 11_3 and the voltage gain of the amplify circuit 111 to the lower limit values or more until the signal disturbance from the outside ends. In this case, the output swing level of the transmission driver 11_3 and the voltage gain of the amplify circuit 111 may be adaptively adjusted. Therefore, in some implementations, it is possible to reduce the power consumption of the second electronic device 100_3 and the vulnerability of the second electronic device 100_3 to the EMI while reducing the influence of noise caused by the external influence of the communication system.

Figure 14:
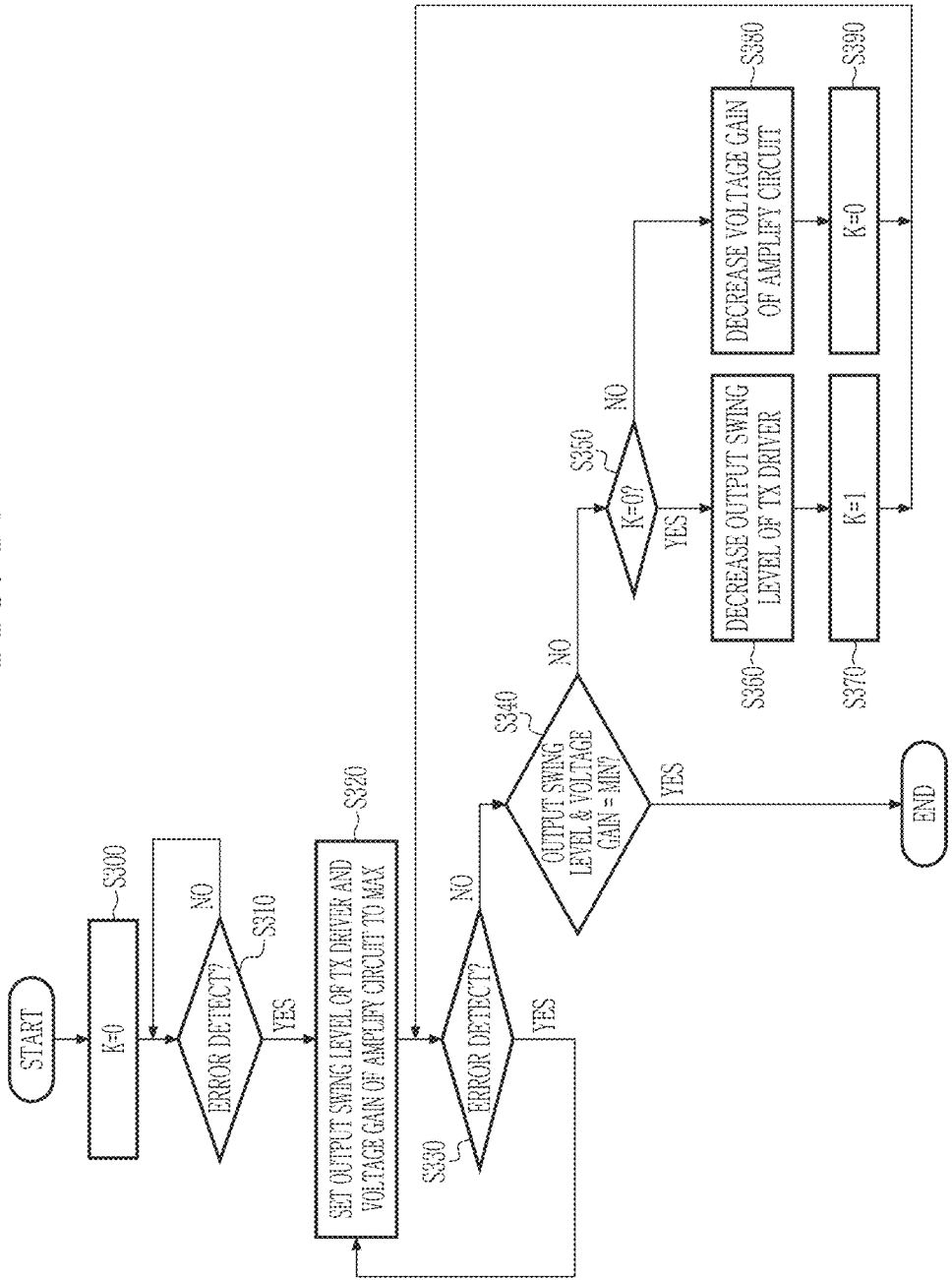
FIG. 14 is a flowchart showing an operation of a second electronic device of FIG. 12.

FIG. 14 is a flowchart showing the operation of the second electronic device of FIG. 12. In this example, steps S310 to S390 are performed after the output swing level of the transmission driver 11_3 and the voltage gain of the amplify circuit 111 are set to the minimum. However, the scope of the present disclosure is not limited thereto.

Referring to FIGS. 1, 2A, 2B, and 12 to 14, in the step S300, a variable 'K' may be set to zero. The variable 'K' is only used to describe the alternating operation of the second electronic device 100_3 and does not limit the scope of the present disclosure.

In the step S310, the second electronic device 100_3 may determine whether the error occurs. An operation of the second electronic device 100_3 in the step S310 is similar to the operation of the second electronic device 100_1 in the step S110 described above, and repeated description is omitted.

The step S310 may be repeatedly performed when error detector 120_3 determines that no error occurs in the step S310. That is, the second electronic device 100_3 may continuously receive the data signal DS while maintaining the output swing level of the transmission driver 11_3 and the voltage gain of the amplify circuit 111 to the minimum. In this case, the power consumption of the second electronic device 100_3 may be reduced.

The following step S320 may be performed when error detector 120_3 determines that the error occurs in the step S310.

In step S320, the second electronic device 100_3 may set the output swing level of the transmission driver 11_3 and the voltage gain of the amplify circuit 111 to the maximum. For example, the error adjuster 130_3 may set the voltage gain of the amplify circuit 111 to the upper limit value by providing the amplify circuit 111 with the gain control signal GCS and set the output swing level of the transmission driver 11_3 to the upper limit value by providing the swing controller 12_3 with the control signal CS through the second channel CH2.

In the step S330, the second electronic device 100_3 may determine whether the error occurs. An operation of the second electronic device 100_3 in the step S330 is similar to the operation of the second electronic device 100_1 in the step S130 described above, and the description thus omits its details.

The step S320 described above may be repeatedly performed when error detector 120_3 determines that the error occurs in the step S330. That is, in some implementations, the output swing level of the transmission driver 11_3 and the voltage gain of the amplify circuit 111 may be maintained to the upper limit values when the error occurs in the operation of the second electronic device 100_3 due to noise caused by the external influence. In this case, the influence of noise on the second electronic device 100_3 may be reduced until noise caused by the external influence is reduced.

The following step S340 may be performed when error detector 120_3 determines that no error occurs in the step S330.

In the step S340, the second electronic device 100_3 may determine whether the output swing level of the transmission driver 11_3 and the voltage gain of the amplify circuit 111 are the minimum. That is, the second electronic device 100_3 may determine whether the output swing level of the transmission driver 11_3 and the voltage gain of the amplify circuit 111 are already the lower limit value.

The following step S350 may be performed when the second electronic device 100_3 determines that none of the output swing level of the transmission driver 11_3 and the voltage gain of the amplify circuit 111 is the minimum in the step S340.

In the step S350, it may be determined whether the variable 'K' is zero. The following steps S360 and S370 may be performed when the variable 'K' is zero, and the following steps S380 and S390 may be performed when the variable 'K' is not zero.

In the step S360, the second electronic device 100_3 may reduce the output swing level of the transmission driver 11_3. For example, the error adjuster 130_3 may reduce the output swing level of the transmission driver 11_3 by providing the swing controller 12_3 with the control signal CS through the second channel CH2. In this case, it is possible to reduce the voltage swing width of the data signal DS output by the transmission driver 11_3 through the first channel CH1.

In the step S370, the variable 'K' may be changed to 1.

In the step S380, the second electronic device 100_3 may reduce the voltage gain of the amplify circuit 111. For example, the error adjuster 130_3 may reduce the voltage gain of the amplify circuit 111 by providing the amplify circuit 111 with the gain control signal GCS. In this case, a magnitude of a signal transferred between components in the reception driver 110_3 may be reduced.

In the step S390, the variable 'K' may be changed to zero.

The step S330 described above may be repeatedly performed after the step S370 or the step S390 is performed. That is, the second electronic device 100_3 may alternately reduce the output swing level of the transmission driver 11_3 and the voltage gain of the amplify circuit 111 until the output swing level of the transmission driver 11_3 and the voltage gain of the amplify circuit 111 are reduced to the minimum values (that is, until the power consumption of the second electronic device 100_3 is reduced).

Meanwhile, the operation of the second electronic device 100_3 may end when the second electronic device 100_3 determines that the output swing level of the transmission driver 11_3 and the voltage gain of the amplify circuit 111 are already the minimum values in the step S340. However, the scope of the present disclosure is not limited thereto, and the second electronic device 100_3 may repeatedly perform the steps S310 to S390 described above when the second electronic device 100_3 determines that the output swing level of the transmission driver 11_3 and the voltage gain of the amplify circuit 111 are already the minimum values in the step S340. In this case, the output swing level of the transmission driver 11_3 and the voltage gain of the amplify circuit 111 may be adaptively adjusted, thus reducing the power consumption of the second electronic device 100_3 while maximizing the immunity of the second electronic device 100_3 to the signal disturbance from the outside.

Figure 15:
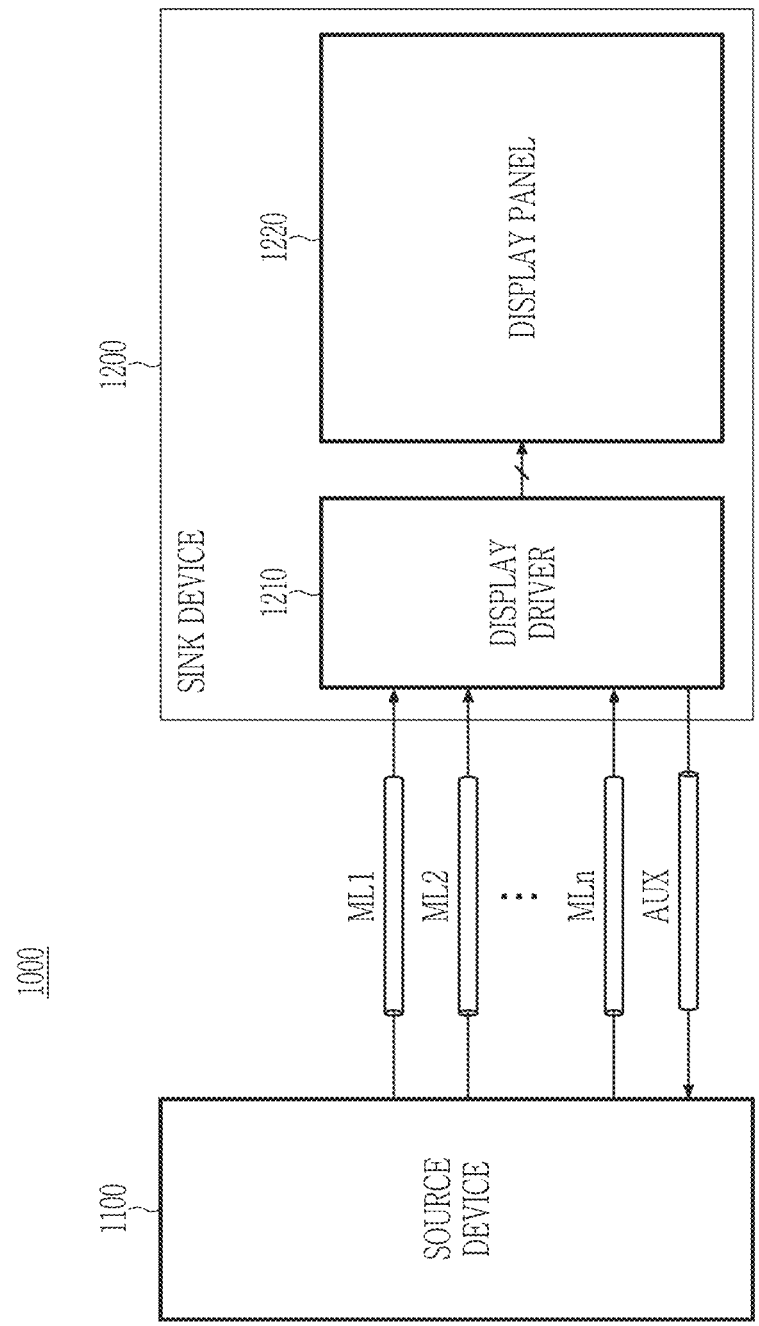
FIG. 15 is a view showing an example of a display system.

FIG. 15 is a view showing a display system. Referring to FIGS. 1 to 15, a display system 1000 may include a source device 1100 and a sink device 1200.

In some implementations, the source device 1100 may be the graphic processing unit (GPU). The sink device 1200 may be the display device.

The sink device 1200 may include a display driver 1210 and a display panel 1220. The display driver 1210 may be connected with the source device 1100 through first to nth main links ML1 to MLn and an auxiliary channel AUX.

The source device 1100 may transfer image data to the display driver 1210 through the first to nth main links ML1 to MLn. The sink device 1200 may control an operation of the source device 1100 through the auxiliary channel AUX.

The display driver 1210 may provide the display panel 1220 with various types of control signals and data provided from the source device 1100. For example, the display driver 1210 may control the display panel 1220 to display images corresponding to the data provided through the first to nth main links ML1 to MLn.

In some implementations, the source device 1100 may be implemented in a similar way as the first electronic device 10 described above with reference to FIGS. 1 to 14. The sink device 1200 may be implemented in a similar way as the second electronic device 100 described above with reference to FIGS. 1 to 14. For example, the display driver 1210 may include the reception driver 110, the error detector 120, and the error adjuster 130. In this case, the sink device 1200 may be implemented to adjust the voltage swing width of data signals transferred from the source device 1100 through the first to nth main links ML1 to MLn, or adjust the voltage gain of the amplify circuit 111 included in the reception driver 110. In this case, it is possible to reduce distortion of the image output by the display panel 1220 corresponding to the functional circuit 140, the distortion being caused by the signal disturbance from the outside.

In some implementations, the display driver 1210 may include the different reception drivers, the different error detectors, and the different error adjusters respectively for the first to nth main links ML1 to MLn. Similarly, the source device 1100 may include the different transmission drivers respectively for the first to nth main links ML1 to MLn. In this case, the display driver 1210 may individually adjust the voltage gain of the amplify circuit for each of the first to nth main links ML1 to MLn or control the voltage swing width of the data signal transferred through the main link. That is, each of the first to nth main links ML1 to MLn may correspond to the first channel CH1 of FIG. 1.

In some implementations, the display driver 1210 may include the plurality of error adjusters (e.g., error adjusters respectively corresponding to the first to nth main links ML1 to MLn). In this case, the plurality of error adjusters may respectively control the different transmission drivers through the auxiliary channel AUX. That is, the plurality of error adjusters may respectively share one auxiliary channel AUX. In this case, the auxiliary channel AUX may correspond to the second channel CH2 of FIG. 1.

Figure 16:
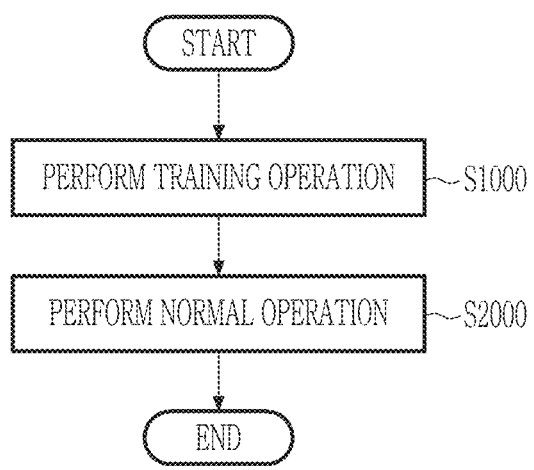
FIG. 16 is a flowchart showing an operation method of the display system of FIG. 15.

FIG. 16 is a flowchart showing an example of an operation method of the display system of FIG. 15.

Referring to FIGS. 1 to 16, in a step S1000, the display system 1000 may perform a training operation. For example, the display system 1000 may perform various types of link training operations, such as a transmission equalizing operation and an offset calibrating operation, for each of the first to nth main links ML1 to MLn. In this case, noise of each channel of the first to nth main links ML1 to MLn may be reduced.

In some implementations, the distortion may occur in the image output by the display panel 1220 when the sudden signal disturbance occurs from the outside even though the link training operation has been performed in the step S1000.

In the step S1000, the display system 1000 may perform a normal operation. For example, the source device 1100 may sequentially transfer the plurality of frame images to the sink device 1200 through the first to nth main links ML1 to MLn.

In some implementations, the source device 1100 may be implemented in a similar way as that described above with reference to FIGS. 1 to 14. For example, the source device 1100 may individually adjust the voltage gain of the amplify circuit for each of the first to nth main links ML1 to MLn or control the voltage swing width of the data signal transferred through the main link. In this case, it is possible to reduce the distortion of the image output by the display panel 1220 when the sudden signal disturbance occurs from the outside.

That is, the operation of the second electronic device 100 described above with reference to FIGS. 1 to 14 (that is, the operation of the display driver 1210) may be performed in a section in which the display system 1000 performs the normal operation rather than a section in which the display system 1000 performs the training operation. However, the scope of the present disclosure is not limited thereto.

Figure 17:
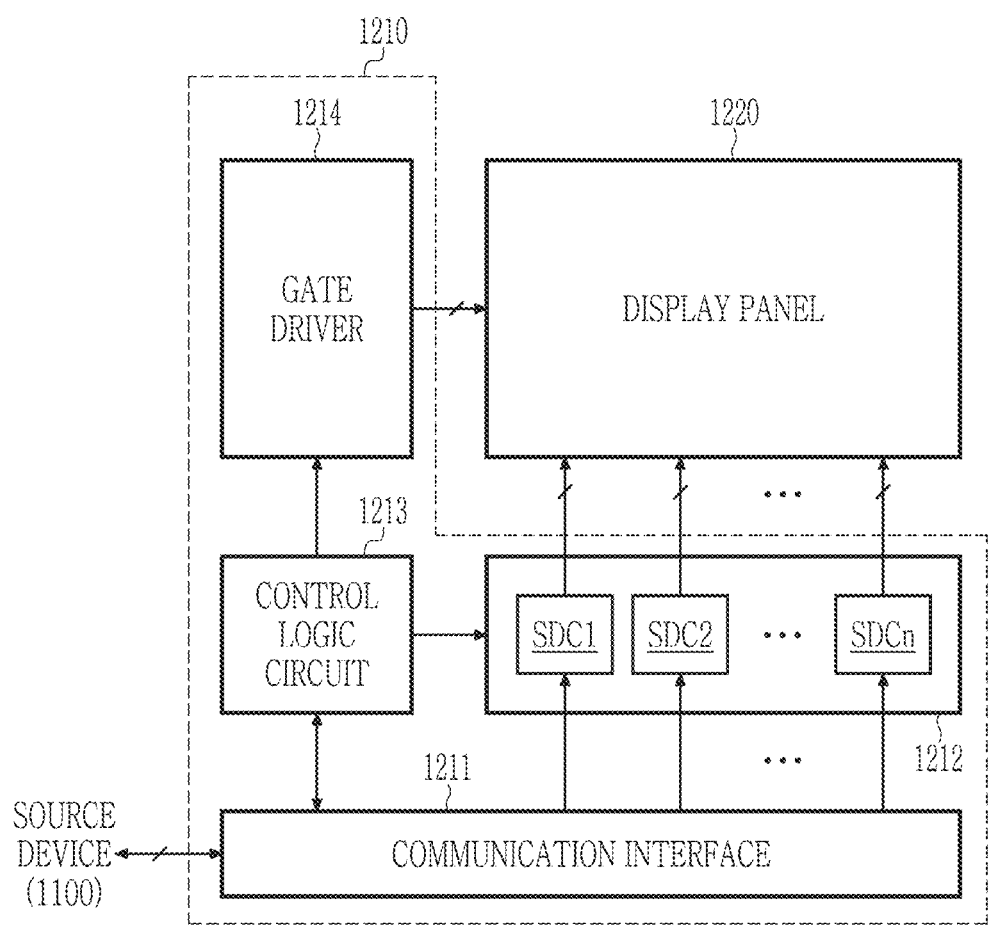
FIG. 17 is a view showing a configuration of a sink device of FIG. 15 in more detail.

FIG. 17 is a view showing a configuration of the sink device of FIG. 15 in more detail.

Referring to FIGS. 1 to 17, the sink device 1200 may include the display driver 1210 and the display panel 1220.

The display panel 1220 may include a plurality of pixels connected to a plurality of gate lines and a plurality of source lines. Each of the plurality of pixels may display one of primary colors in response to an electrical signal provided from the display driver 1210. The primary color may include red, green, and blue. However, the scope of the present disclosure is not limited thereto.

The display driver 1210 may include a communication interface 1211, a source driver 1212, a control logic circuit 1213, and a gate driver 1214.

The communication interface 1211 may be connected with the source device 1100 through a plurality of channels. For example, the communication interface 1211 may connect with the source device 1100 through the first through nth main links ML1 to MLn and the auxiliary channel AUX.

The gate driver 1214 may connect with the display panel 1220 through the plurality of gate lines. The gate driver 1214 may control the plurality of gate lines in response to control of the control logic circuit 1213. That is, the gate driver 1214 may control the pixels of the display panel 1220 in units of rows.

The source driver 1212 may include first to nth source drive circuits SDC1 to SDCn. The first to nth source drive circuits SDC1 to SDCn may be connected to the display panel 1220 respectively through the plurality of different source lines. That is, the source driver 1212 may control the pixels of the display panel 1220 in units of columns.

The first to nth source drive circuits SDC1 to SDCn may respectively receive the data provided through the first to nth main links ML1 to MLn. For example, the communication interface 1211 may provide the first source drive circuit SDC1 with the data provided through the first main link ML1.

In some implementations, the communication interface 1211 may include the reception driver, error detector, and error adjuster, described with reference to FIGS. 1 to 12 for each of the first to nth main links ML1 to MLn. That is, the communication interface 1211 may include the first to nth reception drivers, the first to nth error detectors, and the first to nth error adjusters respectively corresponding to the first to nth main links ML1 to MLn. In this case, an error adjustment operation may be performed for each of the reception drivers connected to the first to nth main links ML1 to MLn in response to the signal disturbance from the outside, thus reducing power consumption of the sink device 1200. For example, when the error occurs only in the operation of the reception driver connected to the first main link ML1, the reception driver connected to the second main link ML2 may be operated with the minimum power, thus reducing the power consumption of the sink device 1200. However, the scope of the present disclosure is not limited thereto.

The control logic circuit 1213 may control all operations of the display driver 1210. For example, the control logic circuit 1213 may control operation timings of the communication interface 1211, the source driver 1212, the control logic circuit 1213, and the gate driver 1214.

Figure 18:
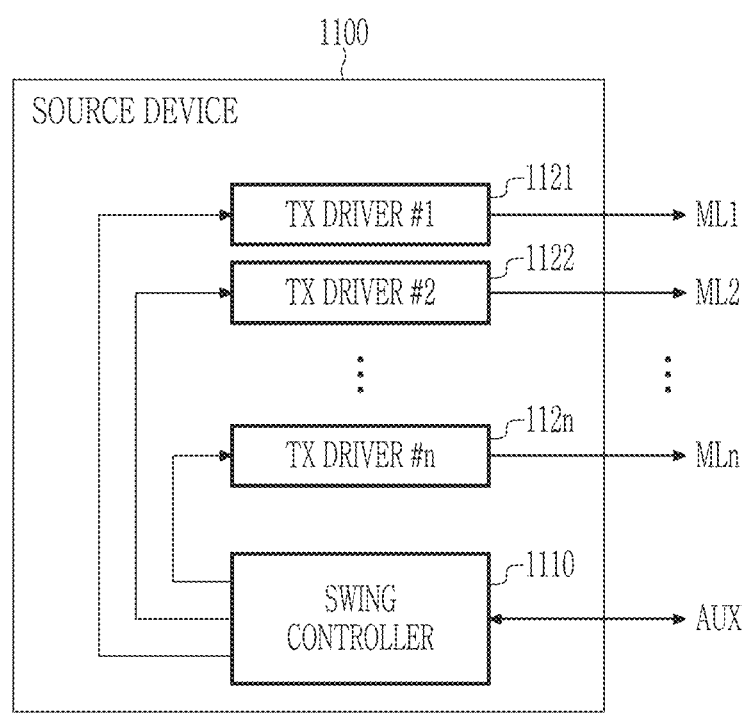
FIG. 18 is a view showing a configuration of a source device of FIG. 15.

FIG. 18 is a view showing a configuration of the source device of FIG. 15. Referring to FIGS. 1 to 18, the source device 1100 may include first to nth transmission drivers 1121 to 112n and a swing controller 1110.

The first to nth transmission drivers 1121 to 112n may respectively be connected to the first to nth main links ML1 to MLn. For example, the first transmission driver 1121 may provide the communication interface 1211 with the data signal through the first main link ML1.

The swing controller 1110 may be connected with the auxiliary channel AUX. For example, the swing controller 1110 may receive the control signal from the communication interface 1211 through the auxiliary channel AUX. The swing controller 1110 may control the output swing levels of the first to nth transmission drivers 1121 to 112n in response to the control signal received through the auxiliary channel AUX. For example, the swing controller 1110 may output the different swing control signal to each of the first to nth transmission drivers 1121 to 112n.

Figure 19:
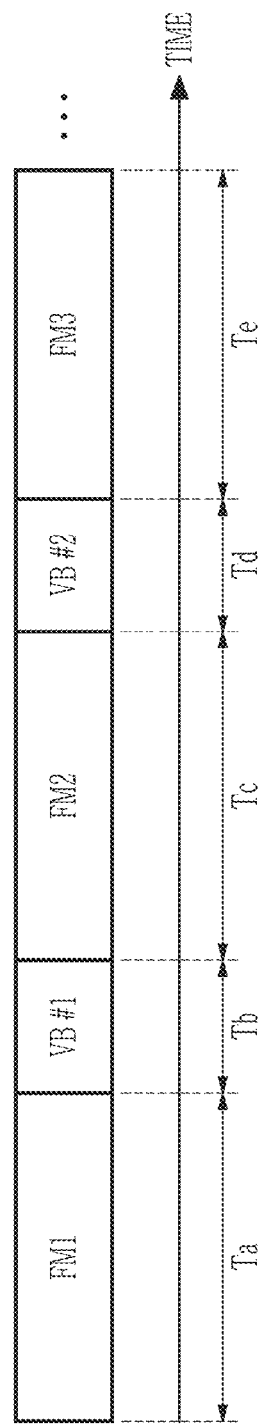
FIG. 19 is a timing diagram showing an operation of the display system of FIG. 15.

FIG. 19 is a timing diagram showing an operation of the display system of FIG. 15. Referring to FIGS. 1 to 19, the sink device 1200 may display a first frame image FM1 during a first time period Ta. The sink device 1200 may display a third frame image FM3 during a third time period Tc. The sink device 1200 may display the third frame image FM3 during a fifth time period Te.

The sink device 1200 may display no image during a second time period Tb between the first time period Ta and the third time period Tc. The sink device 1200 may display no image during a fourth time period Td between the third time period Tc and the fifth time period Te. In this case, the second time period Tb and the fourth time period Td may be referred to as vertical blank periods VB.

In some implementations, the sink device 1200 may control the swing controller 1110 through the auxiliary channel AUX during the vertical blank period VB. For example, the sink device 1200 may receive the first data signal corresponding to the first frame image FM1 from the source device 1100 through the first to nth main links ML1 to MLn. The sink device 1200 may determine whether the error occurs in the operation of the reception drivers connected to the first to nth main links ML1 to MLn. Then, during the vertical blank period VB, the sink device 1200 may control the swing controller 1110 through the auxiliary channel AUX to change the output swing levels of the transmission drivers connected with the reception drivers where the error occurs through the main link to the upper limit values through the auxiliary channel AUX.

In some implementations, the sink device 1200 may adjust the voltage gain of the amplify circuit included in the reception drivers connected to the first to nth main links ML1 to MLn during the vertical blank period VB.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a combination can in some cases be excised from the combination, and the combination may be directed to a subcombination or variation of a subcombination.

The descriptions provided above are the specific embodiments for implementing the present disclosure. The present disclosure may include not only the embodiments described above but also embodiments that may be simply changed in design or easily modified. In addition, the present disclosure may also include techniques that may be easily modified and practiced using the embodiments. Therefore, the scope of the present disclosure should not be limited to the above-described embodiments and should be defined by not only claims described below but also those equivalent to the claims of the present disclosure.

What is claimed is:

1. A communication system comprising:
a first electronic device and a second electronic device that are connected with each other through a first channel and a second channel, wherein the second electronic device includes:
a reception driver configured to generate a first internal signal based on a first data signal provided by the first electronic device through the first channel;
an error detector configured to generate an error detection signal by determining whether an error is included in the first internal signal; and
an error adjuster configured to output a first feedback signal through the second channel based on the error detection signal,
wherein the first electronic device is configured to output a second data signal through the first channel, the second data signal having a voltage swing width determined based on the first feedback signal.

2. The communication system of claim 1, wherein the first electronic device is configured to, based on the error detection signal indicating that the error is included in the first internal signal, output the second data signal having a voltage swing width greater than or equal to a voltage swing width of the first data signal, and
wherein the first electronic device is configured to, based on the error detection signal indicating that no error is included in the first internal signal, output the second data signal having a voltage swing width less than or equal to the voltage swing width of the first data signal.

3. The communication system of claim 2, wherein, the first electronic device is configured to, based on the voltage swing width of the first data signal being an upper limit value and the error detection signal indicating that the error is included in the first internal signal, output the second data signal having the same voltage swing width as the voltage swing width of the first data signal, and
wherein the first electronic device is configured to, based on the voltage swing width of the first data signal not being the upper limit value and the error detection signal indicating that the error is included in the first internal signal, output the second data signal having a voltage swing width of the upper limit value.

4. The communication system of claim 2,
wherein the first electronic device is configured to, based on the voltage swing width of the first data signal being a lower limit value and the error detection signal indicating that no error is included in the first internal signal, output the second data signal having a voltage swing width of a lower limit value, and
wherein the first electronic device is configured to, based on the voltage swing width of the first data signal not being the lower limit value and the error detection signal indicating that no error is included in the first internal signal, output the second data signal having a voltage swing width less than the voltage swing width of the first data signal.

5. The communication system of claim 1, wherein the reception driver includes:
an amplify circuit configured to generate a first amplified data signal based on the first data signal;
an offset calibrate circuit configured to generate a first calibrated data signal based on the first amplified data signal; and
a clock and data recovery (CDR) circuit configured to generate a first bitstream based on the first calibrated data signal,
wherein the second electronic device further includes a functional circuit configured to operate based on the first bitstream.

6. The communication system of claim 5, wherein the first channel includes a non-inverted channel line and an inverted channel line,
wherein the reception driver includes a first terminal resistor connected between the non-inverted channel line and an intermediate node, and a second terminal resistor connected between the inverted channel line and the intermediate node, and
wherein the error detector includes a first error detection circuit, and
wherein the first error detection circuit is configured to, based on a voltage level of the intermediate node corresponding to the first internal signal being out of a reference voltage level range, generate the error detection signal indicating that the error is included in the first internal signal.

7. The communication system of claim 5, wherein the error detector includes a second error detection circuit, and
wherein the second error detection circuit is configured to, based on an offset magnitude of the first calibrated data signal corresponding to the first internal signal being greater than a reference voltage, generate the error detection signal indicating that the error is included in the first internal signal.

8. The communication system of claim 5, wherein the error detector includes a third error detection circuit, and
wherein the third error detection circuit is configured to, based on a bit error rate (BER) of the first bitstream corresponding to the first internal signal being greater than a reference value, generate the error detection signal indicating that the error is included in the first internal signal.

9. The communication system of claim 1, wherein the first electronic device is a graphic processing unit (GPU), the second electronic device is a display device, the first channel is a first main link, and the second channel is an auxiliary channel.

10. The communication system of claim 9, wherein the first data signal corresponds to a first frame image, and the second data signal corresponds to a second frame image.

11. The communication system of claim 10, wherein the second electronic device is configured to output the first feedback signal through the second channel during a vertical blank period that is between a first time period in which the first frame image is displayed and a second time period in which the second frame image is displayed.

12. The communication system of claim 9, wherein the first electronic device is configured to, based on a training operation for the first channel being completed, provide the first data signal and the second data signal to the second electronic device.

13. An electronic device comprising:
a reception driver including an amplify circuit configured to generate a first amplified data signal based on a first data signal provided by an external device;
an error detector configured to generate an error detection signal by determining whether an error occurs in an operation of the reception driver configured to generate a first bitstream based on the first amplified data signal; and
an error adjuster configured to control a voltage gain of the amplify circuit based on the error detection signal,
wherein the error adjuster is configured to, based on the error detection signal indicating that the error occurs in the operation of the reception driver, maintain or increase the voltage gain of the amplify circuit, and
wherein the error adjuster is configured to, based on the error detection signal indicating that no error occurs in the operation of the reception driver, maintain or reduce the voltage gain of the amplify circuit.

14. The electronic device of claim 13, wherein the error adjuster is configured to, based on the voltage gain of the amplify circuit being an upper limit value and the error detection signal indicating that the error occurs in the operation of the reception driver, maintain the voltage gain of the amplify circuit, and
wherein the error adjuster is configured to, based on the voltage gain of the amplify circuit not being the upper limit value and the error detection signal indicating that the error occurs in the operation of the reception driver, increase the voltage gain of the amplify circuit to the upper limit value.

15. The electronic device of claim 13, wherein the error adjuster is configured to, based on the voltage gain of the amplify circuit being a lower limit value and the error detection signal indicating that no error occurs in the operation of the reception driver, maintain the voltage gain of the amplify circuit, and
wherein the error adjuster is configured to, based on the voltage gain of the amplify circuit not being the lower limit value and the error detection signal indicating that no error occurs in the operation of the reception driver, reduce the voltage gain of the amplify circuit.

16. The electronic device of claim 13, wherein the amplify circuit includes a continuous time linear equalization (CTLE) circuit, and
wherein the error adjuster is configured to control the voltage gain by controlling a magnitude of at least one bias current source included in the CTLE circuit.

17. A communication system comprising:
- a first electronic device including a transmission driver; and
- a second electronic device configured to receive a data signal from the transmission driver through a first channel, wherein the second electronic device includes:
  - a reception driver including an amplify circuit configured to amplify the data signal through the first channel;
  - an error detector configured to generate an error detection signal based on whether an error occurs in an operation of the reception driver in response to the data signal; and
  - an error adjuster configured to, based on the error detection signal, control an output swing level of the transmission driver and a voltage gain of the amplify circuit.

18. The communication system of claim 17, wherein the error adjuster is configured to:
- change the output swing level and the voltage gain to upper limit values in response to a first data signal,
- reduce the output swing level in response to a second data signal, and
- reduce the voltage gain in response to a third data signal.

19. The communication system of claim 18, wherein the first electronic device is a graphic processing unit (GPU), the second electronic device is a display device, and the first to third data signals respectively correspond to first to third frames that are continuous with each other.

* * * * *